(12) United States Patent
Nishihara et al.

(10) Patent No.: US 8,773,755 B2
(45) Date of Patent: Jul. 8, 2014

(54) OPTICAL AMPLIFIER AND MULTICORE FIBER

(75) Inventors: Masato Nishihara, Kawasaki (JP); Takeshi Hoshida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 93 days.

(21) Appl. No.: 13/597,977

(22) Filed: Aug. 29, 2012

(65) Prior Publication Data

US 2013/0063809 A1 Mar. 14, 2013

(30) Foreign Application Priority Data

Sep. 9, 2011 (JP) ................... 2011-196645

(51) Int. Cl.
*H01S 3/091* (2006.01)

(52) U.S. Cl.
USPC ..................................... 359/341.1; 359/341.3

(58) Field of Classification Search
USPC .................. 372/6; 359/341.1, 341.3; 385/126
See application file for complete search history.

(56) References Cited

U.S. PATENT DOCUMENTS

| | | | | |
|---|---|---|---|---|
| 4,546,476 A | * | 10/1985 | Shaw et al. | 372/6 |
| 4,730,886 A | * | 3/1988 | Hicks | 385/12 |
| 4,938,561 A | * | 7/1990 | Grasso et al. | 359/341.1 |
| 5,218,665 A | * | 6/1993 | Grasso et al. | 385/142 |
| 5,566,196 A | * | 10/1996 | Scifres | 372/6 |
| 5,742,722 A | * | 4/1998 | Imoto | 385/126 |

FOREIGN PATENT DOCUMENTS

JP 2-2533 1/1990

OTHER PUBLICATIONS

Peter M. Krummrich, et al., "Evaluation of Potential Optical Amplifier Concepts for Coherent Mode Multiplexing", Optical Fiber Communication Conference and Exposition (OFC/NFOEC), 2011 and the National Fiber Otpic Engineers Conference, pp. 1-3.

* cited by examiner

*Primary Examiner* — Mark Hellner
(74) *Attorney, Agent, or Firm* — Staas & Halsey LLP

(57) ABSTRACT

An optical amplifier includes a pump light source that outputs pump light, and a multicore fiber that includes at least one pumping core, the pump light being input to the at least one pumping core by coupler, at least two signal light cores doped with an active substance for optical amplification, at least one signal light being input to at least one of the signal light cores, and a cladding, wherein the pump light propagating the at least one pumping core and exciting the active substance in the signal light cores, so as to amplify the at least one signal light propagating through the at least one of the signal light cores.

12 Claims, 26 Drawing Sheets

OPTICAL AMPLIFIER AND MULTICORE FIBER

CROSS-REFERENCE TO RELATED APPLICATION

This application is based upon and claims the benefit of priority of the prior Japanese Patent Application No. 2011-196645, filed on Sep. 9, 2011, the entire contents of which are incorporated herein by reference.

FIELD

The embodiments discussed herein are related to an optical amplifier that amplifies light and a multicore fiber including a plurality of cores.

BACKGROUND

Nowadays, the increase in transmission traffic is increasing demands for large capacity optical transmission systems. In wavelength division multiplexing (WDM), in order to increase the transmission capacity per wavelength, multiple phase shift keying and digital coherent receivers have been introduced, and 100-Gbps-per-wavelength class optical transmission technologies have been developed.

From a viewpoint different from an increase in the transmission capacity per wavelength, optical transmission technologies using multicore fibers are attracting attention as technologies with which the transmission capacity per optical fiber is increased.

Generally, an optical fiber has a single core therein and signal light is transmitted through the single core. A multicore fiber has a plurality of cores in an optical fiber and signal light is transmitted through the plurality of cores. This may increase the transmission capacity per optical fiber as many times as the number of cores.

As related art, optical amplification technologies using multicore fibers have been proposed. One of related-art technologies is, for example, discussed in Japanese Laid-open Patent Publication No. 2-002533.

However, with a related-art optical fiber amplifier that amplifies light using a multicore fiber, excitation is performed in each of the cores. Thus, pump light sources are usually provided as many as the number of cores of the multicores. This increases the number of components of the optical fiber amplifier and the size of the optical fiber amplifier, thereby increasing the size of the circuitry.

SUMMARY

According to an aspect of the embodiments, an optical amplifier includes a pump light source that outputs pump light, and a multicore fiber that includes a pumping core, the pump light being input to the pumping core by coupler, at least two signal light cores doped with an active substance for optical amplification, at least one signal light being input to at least one of the signal light cores, and a cladding, wherein the pump light propagating the pumping core and exciting the active substance in the signal light cores, so as to amplify the at least one signal light propagating through the at least one of the signal light cores.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
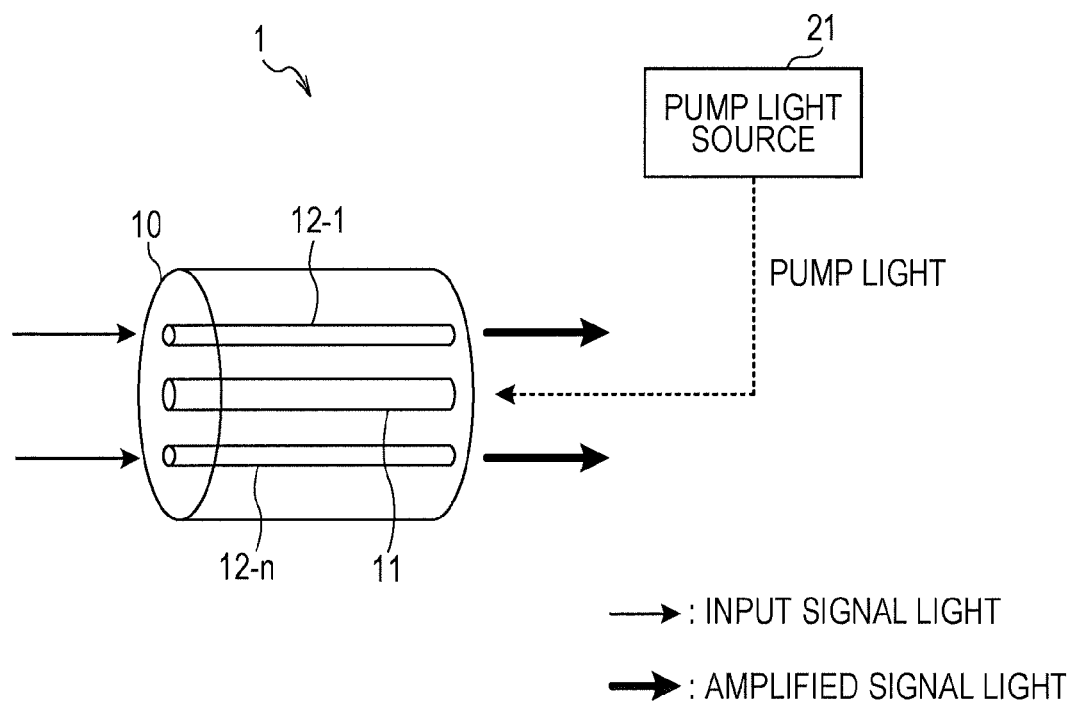
FIG. 1 illustrates an example of the structure of an optical amplifier.

Embodiments will be described below with reference to the drawings. FIG. 1 illustrates an example of the structure of an optical amplifier. An optical amplifier 1 includes a multicore fiber 10 and a pump light source 21.

The multicore fiber 10 is an optical fiber that includes a pumping core 11 and a plurality of signal light cores 12-1 to 12-n. The pumping core 11 of the multicore fiber 10 may be arranged such that, for example, the pumping core 11 is surrounded by the signal light cores 12-1 to 12-n.

Pump light output from the pump light source 21 controlled by a controller may be input to the pumping core 11. The pump light source 21 may use, for example, a laser diode. The signal light cores 12-1 to 12-n are doped with an active substance for optical amplification (such as ions of a rare earth element). Signal light is input to the signal light cores 12-1 to 12-n. The rare earth element may be, for example, erbium, thulium, neodymium, praseodymium, or the like.

The pump light from the pump light source 21 may be introduced into the pumping core 11 through a wave plate, which changes the state of a polarized wave. With the wave plate, variation in amplification factor among signal light cores 12-1 to 12-n may be suppressed. The wave plate may use, for example, a quarter-wave plate. Directions of a plurality of polarized waves of the pump light, the pump light being introduced into the pumping core 11, may be perpendicular to each other.

Here, the signal light propagating through the signal light cores 12-1 to 12-n is amplified by exciting the active substance for optical amplification, with which the signal light cores 12-1 to 12-n are doped, using pump light radially propagating from the pumping core 11 (although pumping illustrated in an example in FIG. 1 is forward pumping, the pumping may be backward pumping). The state in which the pump light radially propagates from the pumping core 11 will be later described with reference to FIG. 8.

As described above, the optical amplifier 1 collectively amplifies all the signal light propagating through the signal light cores 12-1 to 12-n by collectively exciting the active substance for optical amplification, with which the signal light cores 12-1 to 12-n are doped, using the pump light radially propagating from the pumping core 11.

Thus, a common pumping core 11 supplies the pump light to the signal light cores 12-1 to 12-n instead of providing a pump light source for each of the signal light cores 12-1 to 12-n and separately supplying the pump light to each of the signal light cores 12-1 to 12-n. This may decrease the number of the pump light source, and accordingly, may reduce the size of circuitry.

Figure 2:
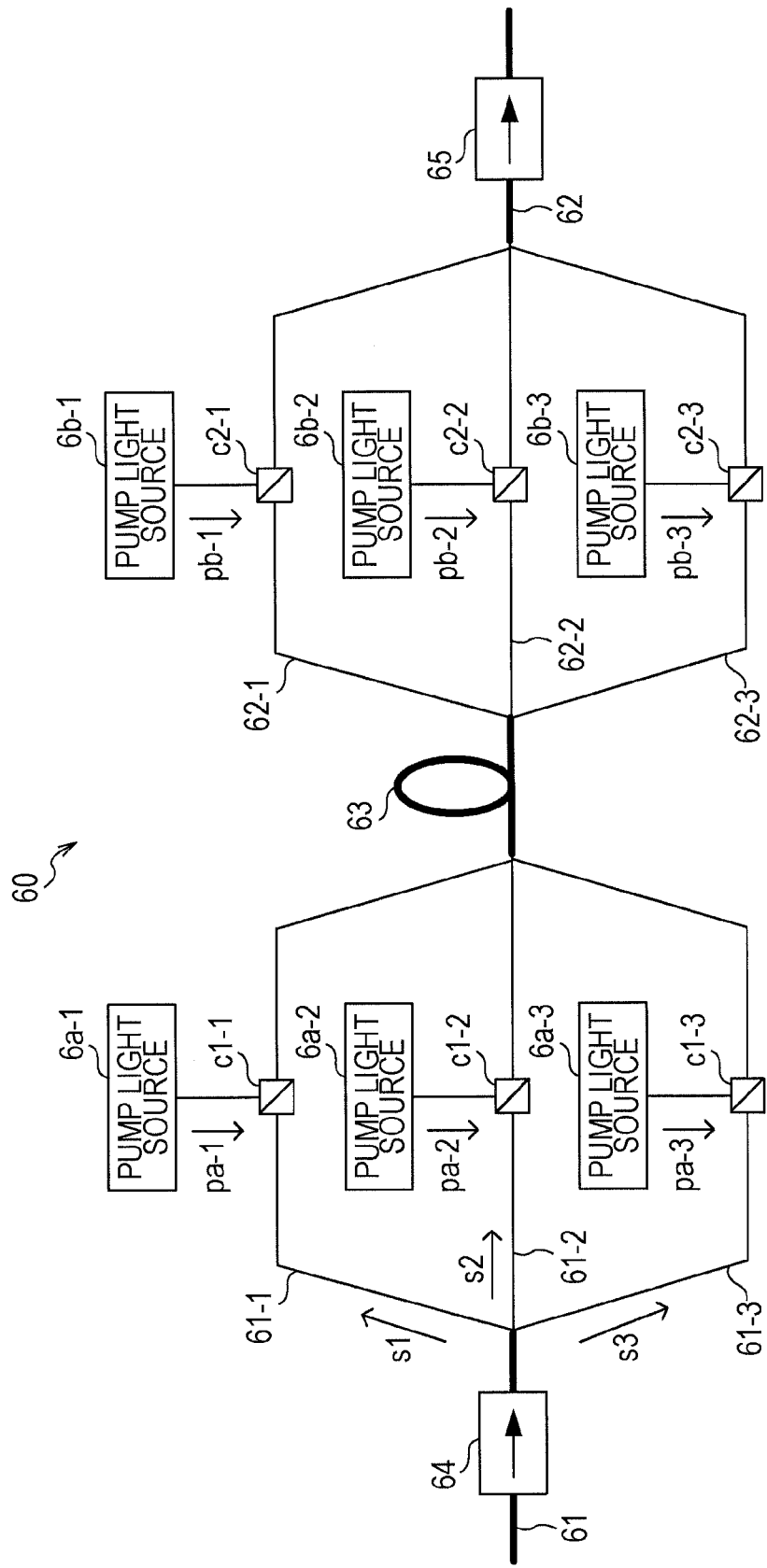
FIG. 2 illustrates an example of the structure of an optical fiber amplifier.

Next, the structure of a related-art optical fiber amplifier using a multicore fiber will be described. FIG. 2 illustrates an example of the structure of an optical fiber amplifier. A related-art optical fiber amplifier 60 includes multicore fibers 61 and 62, a multicore erbium doped fiber (EDF) 63, pump light sources 6a-1 to 6a-3 and 6b-1 to 6b-3, couplers c1-1 to c1-3 and c2-1 to c2-3, and optical isolators 64 and 65.

The multicore fiber 61 includes three cores 61-1 to 61-3. The multicore fiber 62 includes three cores 62-1 to 62-3.

The optical fiber amplifier 60 performs bi-directional pumping on the multicore EDF 63. In the bi-directional pumping, the multicore EDF 63 is pumped from both forward and backward directions.

With respect to the cores 61-1 to 61-3, signal light s1 to propagate through the core 61-1, signal light s2 to propagate through the core 61-2, and signal light s3 to propagate through the core 61-3 pass through the optical isolator 64.

Optical isolators such as the optical isolators 64 and 65 are devices that allow signal light to pass through in a single direction (left to right in FIG. 2), and suppress propagation of light in the opposite direction. The optical isolators are used to, for example, suppress reflection of light at an optical connector and the like.

The coupler c1-1 is connected to the core 61-1. The coupler c1-1 inputs pump light pa-1 output from the pump light source 6a-1 to the core 61-1 in the same direction as the traveling direction of the signal light s1.

The coupler c1-2 is connected to the core 61-2. The coupler c1-2 inputs pump light pa-2 output from the pump light source 6a-2 to the core 61-2 in the same direction as the traveling direction of the signal light s2.

The coupler c1-3 is connected to the core 61-3. The coupler c1-3 inputs pump light pa-3 output from the pump light source 6a-3 to the core 61-3 in the same direction as the traveling direction of the signal light s3.

After that, the signal light s1 to s3 propagating through the cores 61-1 to 61-3 are input to the multicore EDF 63. The pump light pa-1 to pa-3 output from the pump light sources 6a-1 to 6a-3 are also input to the multicore EDF 63.

Cores of the multicore EDF 63 are doped with $Er^{3+}$ (erbium ions), which are ions of one of rare earth elements. In the cores of the multicore EDF 63 that receive the signal light s1 and the pump light pa-1, $Er^{3+}$ is excited by the pump light pa-1. The signal light s1 traveling through one of the cores, in which $Er^{3+}$ is being excited, causes stimulated emission to occur, and accordingly, optical power of the signal light 51 is amplified.

In the core of the multicore EDF 63 that receives the signal light s2 and the pump light pa-2, $Er^{3+}$ is excited by the pump light pa-2. The signal light s2 traveling through the core, in which $Er^{3+}$ is being excited, causes stimulated emission to occur, and accordingly, optical power of the signal light s2 is amplified.

In the core of the multicore EDF 63 that receives the signal light s3 and the pump light pa-3, $Er^{3+}$ is excited by the pump light pa-3. The signal light s3 traveling through the core, in which $Er^{3+}$ is being excited, causes stimulated emission to occur, and accordingly, optical power of the signal light s3 is amplified.

The coupler c2-1 is connected to the core 62-1. The coupler c2-1 inputs pump light pb-1 output from the pump light source 6b-1 to the core 62-1 in a direction opposite to the traveling direction of the signal light s1.

The coupler c2-2 is connected to the core 62-2. The coupler c2-2 inputs pump light pb-2 output from the pump light source 6b-2 to the core 62-2 in a direction opposite to the traveling direction of the signal light s2.

The coupler c2-3 is connected to the core 62-3. The coupler c2-3 inputs pump light pb-3 output from the pump light source 6b-3 to the core 62-3 in a direction opposite to the traveling direction of the signal light s3.

The pump light pb-1 to pb-3 output from the pump light sources 6b-1 to 6b-3 are input to the multicore EDF 63.

In the core of the multicore EDF 63, to which the pump light pb-1 has been input, $Er^{3+}$ is excited by the pump light pb-1. The signal light 51 traveling through the core, in which $Er^{3+}$ is being excited, causes stimulated emission to occur, and accordingly, optical power of the signal light s1 is amplified.

In the core of the multicore EDF 63, to which the pump light pb-2 has been input, $Er^{3+}$ is excited by the pump light pb-2. The signal light s2 traveling through the core, in which $Er^{3+}$ is being excited, causes stimulated emission to occur, and accordingly, optical power of the signal light s2 is amplified.

In the core of the multicore EDF 63, to which the pump light pb-3 has been input, $Er^{3+}$ is excited by the pump light pb-3. The signal light s3 traveling through the core, in which $Er^{3+}$ is being excited, causes stimulated emission to occur, and accordingly, optical power of the signal light s3 is amplified.

The signal light s1 to s3, which have been optically amplified by forward and backward pumping, pass through the optical isolator 65 and are output to a subsequent processing unit.

As described above, the structure of the related-art optical fiber amplifier 60, in which light is amplified using the multicore fibers 61 and 62, pump light sources are provided as many as the number of cores of the multicores. This increases the number of components of the optical fiber amplifier 60 and the size of the optical fiber amplifier 60, thereby increasing the size of circuitry.

The present technology has been developed in view of the above-described situation. The present technology provides an optical amplifier with size-reduced optical amplification circuitry using a multicore fiber, and a multicore fiber with which size reduction of the optical amplification circuitry may be realized.

Next, an example of the structure of the multicore fiber 10 will be described. Hereafter, the multicore fiber 10 illustrated in FIG. 1 is considered to be a multicore fiber doped with $Er^{3+}$ as ions of a rare earth element and referred to as a multicore EDF.

Figure 3:
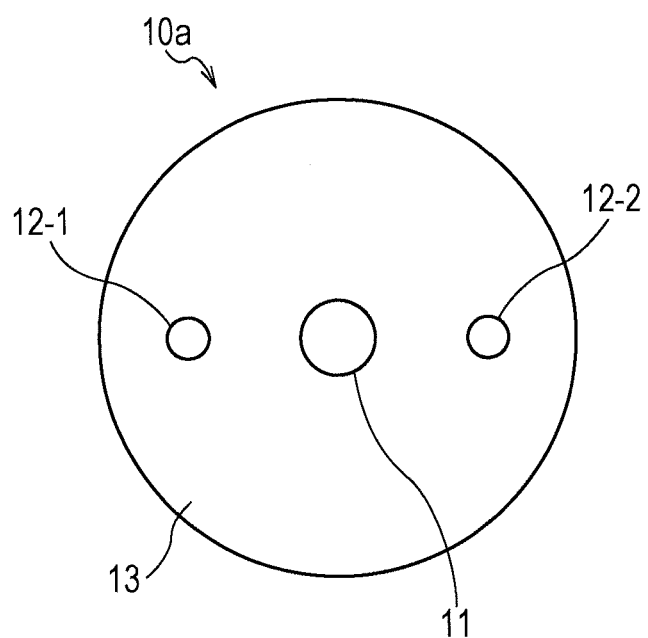
FIG. 3 illustrates a section of a multicore erbium doped fiber (EDF).

FIG. 3 illustrates a section of a multicore EDF. A multicore EDF 10a includes the pumping core 11, the signal light cores 12-1 to 12-n, and cladding 13. Although the two signal light cores 12-1 and 12-2 are illustrated in FIG. 2, the number of signal light cores may be any number more than one.

Figure 4A:
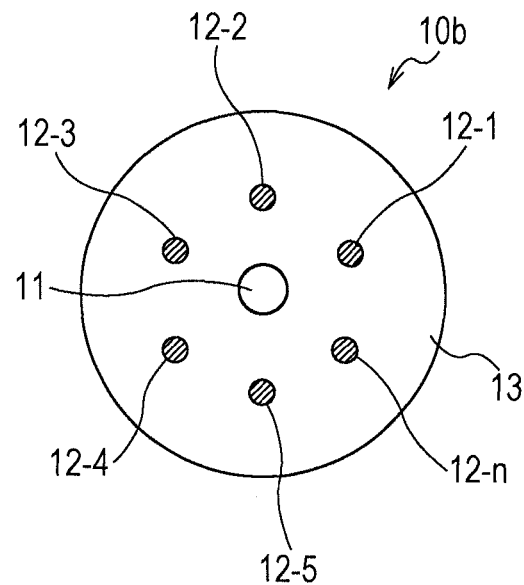
FIGS. 4A and 4B illustrate sections of multicore EDFs.

FIG. 4A illustrates a section of a multicore EDF. A multicore EDF 10b includes the pumping core 11, the signal light cores 12-1 to 12-n, and the cladding 13.

The pumping core 11 is disposed at the center of an optical fiber. The signal light cores 12-1 to 12-n are disposed around the pumping core 11 at positions separated from the pumping core 11 by a certain distance. The pumping core 11 and the signal light cores 12-1 to 12-n are surrounded by the cladding 13.

Figure 4B:
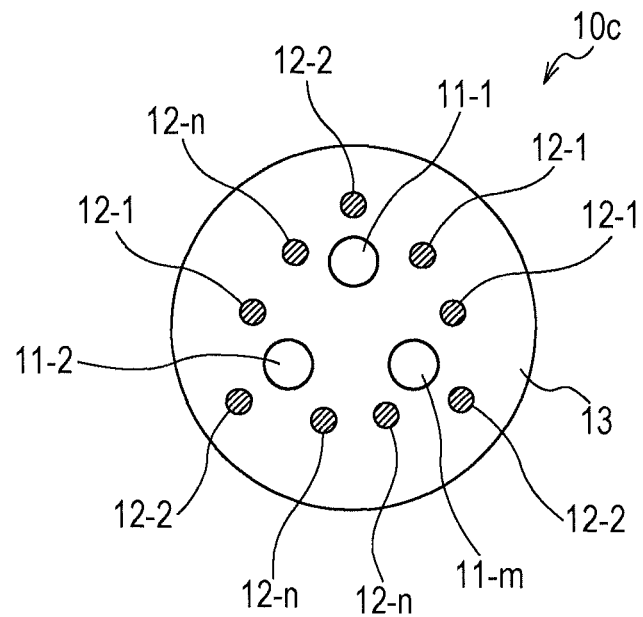

FIG. 4B illustrates a section of a multicore EDF. A multicore EDF 10c includes pumping cores 11-1 to 11-m, which are each provided with signal light cores 12-1 to 12-n. A pumping core group 11 and signal light core groups 12 are surrounded by the cladding 13. The pumping cores 11-1 to 11-m may be represented as the pumping core 11 where appropriate. Each pumping core of pumping core groups may independently inputs an optical pumping power by a controller so that amplifying gains may be different each of the pumping core groups.

The multicore EDF 10c includes a plurality of pumping cores 11 corresponding to a plurality of signal light core groups 12. The multicore EDF 10c is useful in the case where, for example, it is desired that power of the pump light for signal light core groups 12 be distributed among a plurality of pumping cores. In an alternative embodiment, signal light in different bands may be caused to propagate through the respective signal light core groups 12 corresponding to pumping cores 11-1 to 11-m, and each signal light core may be doped with ions of a rare earth element suitable for the corresponding signal light band (for example, such as the C-, L-, or S-band) and may be doped using a suitable doping method. By doing this, signal light in different bands may be optically amplified using the multicore EDF 10c. Pump light of at least one of different wavelengths or pump light with at least one of different magnitudes of power may be caused to propagate through each pumping core.

In order to cause the pump light to radially propagate so that the pump light reaches the signal light cores 12-1 to 12-n, the pumping cores 11 and 11-1 to 11-m are designed such that core diameters of the pumping cores 11 and 11-1 to 11-m are larger than those of the signal light cores 12-1 to 12-n.

The signal light cores 12-1 to 12-n are doped with $Er^{3+}$ as an active substance for optical amplification. In optical amplification, the signal light is input to the signal light cores 12-1 to 12-n, and the pump light is input to the pumping cores 11.

Figure 5:
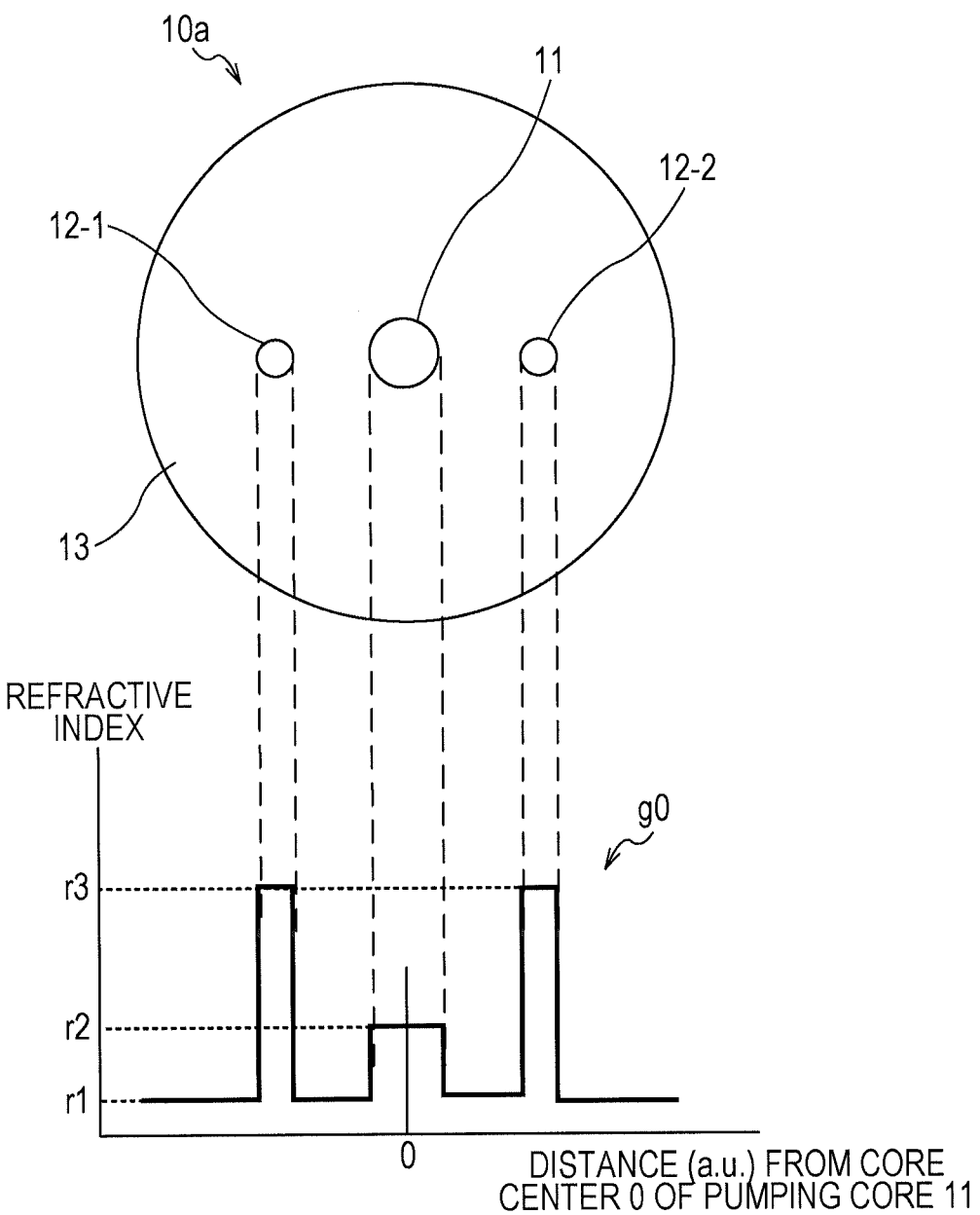
FIG. 5 illustrates distribution of refractive index.

Next, refractive indices of the pumping core 11, signal light cores 12-1 to 12-n, and the cladding 13 will be described. FIG. 5 illustrates an example of distribution of refractive index. A graph g0 illustrates refractive indices of the pumping core 11, the signal light cores 12-1 to 12-n, and the cladding 13. In FIG. 5, only the signal light cores 12-1 and 12-2 are illustrated for simplicity of illustration. The vertical axis indicates the refractive index and the horizontal axis indicates the distance from a core center 0 of the pumping core 11 (in an arbitrary unit (a.u.)).

The refractive index r3 of the signal light cores 12-1 to 12-n is set to be a level at which the signal light is confined in the signal light cores 12-1 to 12-n, and designed such that the refractive index r3 is higher than the refractive index r2 of the pumping core 11 and the refractive index r1 of the cladding 13. The signal light is transmitted while being confined in the signal light cores 12-1 to 12-n.

The refractive index r2 of the pumping core 11 is set to be a level at which pump light radially propagates from the inside of the pumping core 11, and designed such that the refractive index r2 is lower than the refractive index r3 of the signal light cores 12-1 to 12-n and higher than the refractive index r1 of the cladding 13.

With such refractive indices, the pump light propagating through the pumping core 11 is not completely confined in the pumping core 11 and may radially propagate (spread) from the pumping core 11 through the cladding 13.

Figure 6:
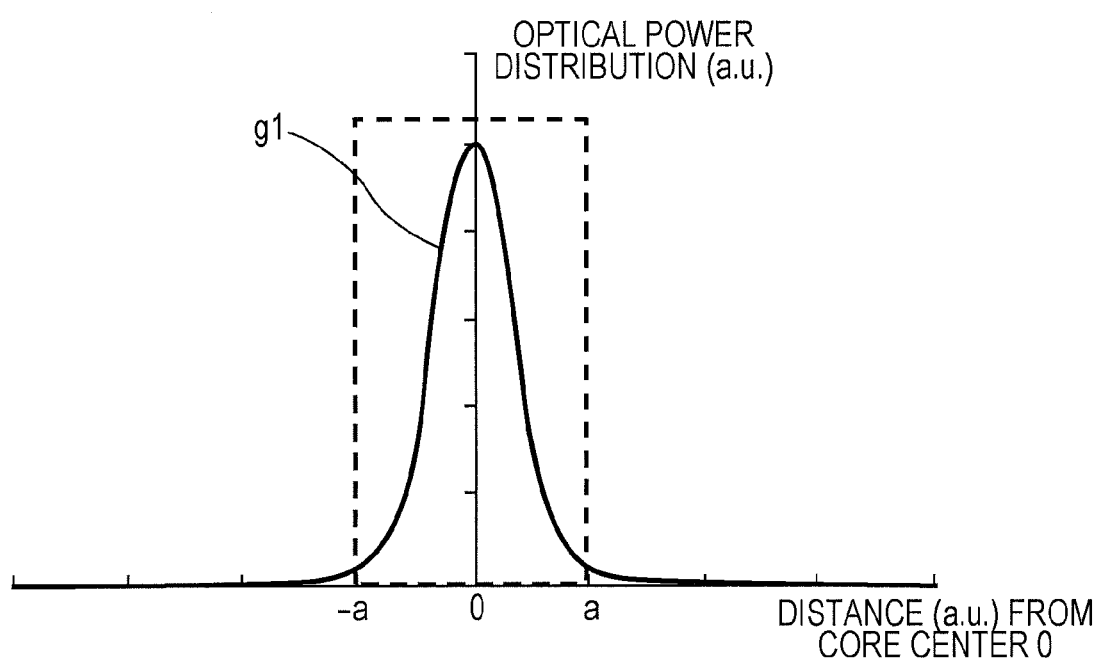
FIG. 6 illustrates optical power distribution of the signal light cores.

Next, optical power distributions in the signal light cores 12-1 to 12-n and the pumping core 11 will be described. FIG. 6 illustrates optical power distribution in the signal light cores 12-1 to 12-n. A waveform g1 indicates the optical power distribution of the signal light propagating through one of the signal light cores 12-1 to 12-n.

The vertical axis indicates the optical power distribution and the horizontal axis indicates the distance from a core center 0 of one of the signal light cores 12-1 to 12-n. Core diameters of the signal light cores 12-1 to 12-n are represented by a (in a.u.).

When the signal light is transmitted (for example, at a wavelength of 1550 nm) through the signal light cores 12-1 to 12-n, the optical power of the signal light is highest at the core center 0 of each of the signal light cores 12-1 to 12-n and the optical power decreases as the distance from the core center 0 increases.

When the distance from the core center 0 is given by d for each of the signal light cores 12-1 to 12-n, the signal light is confined in the signal light cores 12-1 to 12-n when d is in a range in which $-a \leq d \leq a$. Thus, the optical power of the signal light is markedly distributed in the range in which $-a \leq d \leq a$. In contrast, in a range in which the distance d from the core center 0 is $d < -a$ or $a < d$ for the signal light cores 12-1 to 12-n, the optical power of the signal light is close to zero and the light is hardly distributed in the range in which $d < -a$ or $a < d$.

Figure 7:
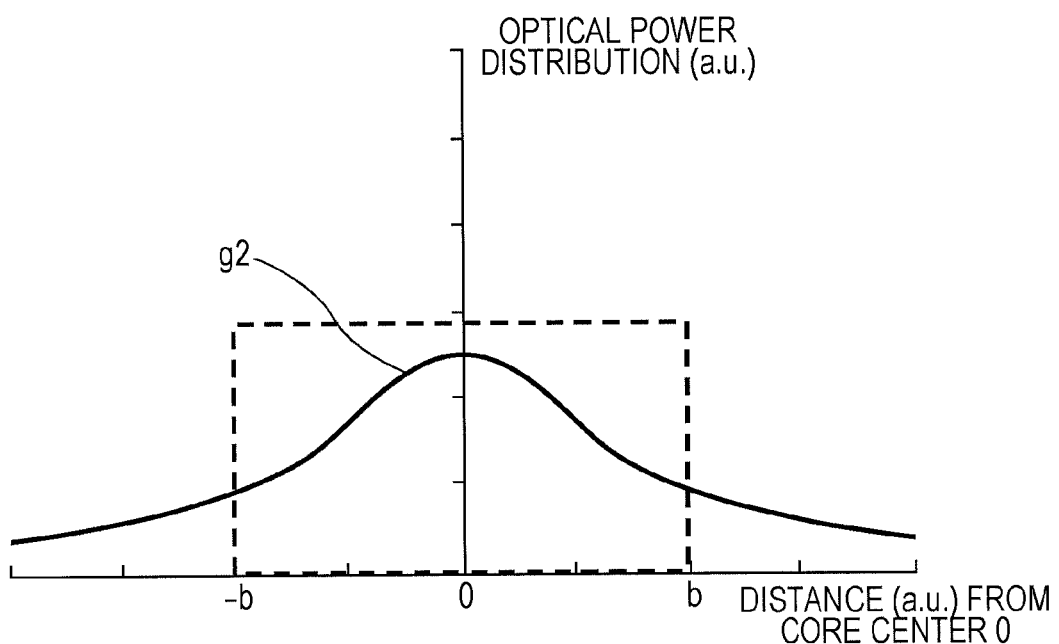
FIG. 7 illustrates optical power distribution of a pumping core.

FIG. 7 illustrates optical power distribution of the pumping core 11. A waveform g2 indicates the optical power distribution of the pump light propagating through the pumping core 11. The vertical axis indicates the optical power distribution and the horizontal axis indicates the distance from the core center 0 of the pumping core 11 (in a.u.). The core diameter of the pumping core 11 is represented by b.

When the pump light is transmitted (for example, at a wavelength of 1480 nm) through the pumping core 11, the optical power of the pump light is highest at the core center 0 of the pumping core 11 and the optical power decreases as the distance from the core center 0 of the pumping core 11 increases.

In addition, when the distance d from the core center 0 of the pumping core 11 is in a range in which $d < -b$ or $b < d$, the optical power of the pump light is not distributed in a range near zero, but distributed to certain higher levels because the pump light propagating through the pumping core 11 is not completely confined in the pumping core 11.

The pump light having the optical power in the range in which $d < -b$ or $b < d$ radially isotropically (equally) propagates from the pumping core 11, and excites $Er^{3+}$, with which the signal light cores 12-1 to 12-n disposed around the pumping core 11 are doped.

Figure 8:
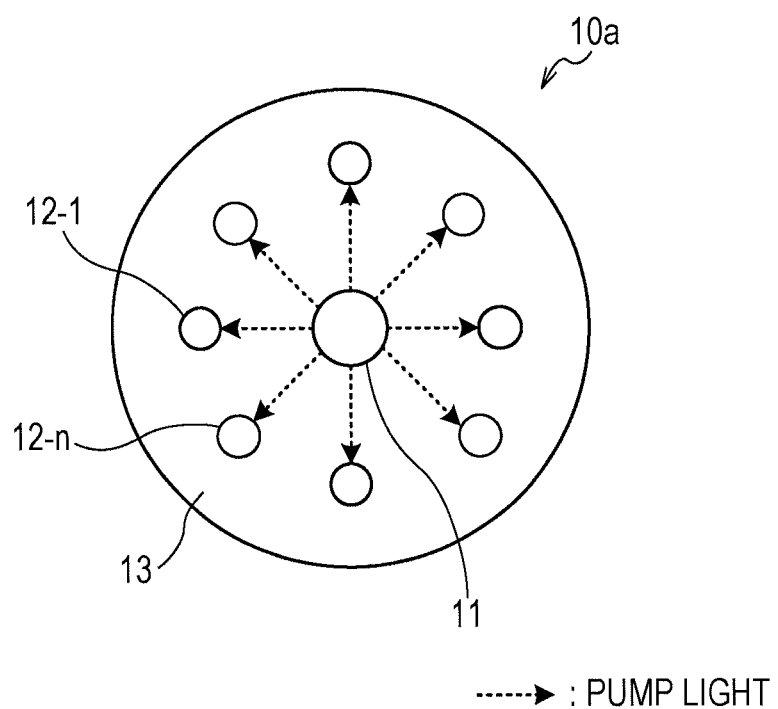
FIG. 8 illustrates radial propagation of pump light.

Next, radial propagation of the pump light will be described. FIG. 8 illustrates radial propagation of the pump light. The refractive index of the pumping core 11 is designed to be low in the pumping core 11 so that, as described above, the pump light radially propagates from the pumping core 11.

Thus, in optical amplification, the pump light propagating through the pumping core 11 radially isotropically propagates (dotted lines with arrows in FIG. 8) outward from the pumping core 11 through the cladding 13 and reaches the signal light cores 12-1 to 12-n (an image is which the pump light spreads from the pumping core 11 through the cladding 13 and reaches the signal light cores 12-1 to 12-n). The pump light having reached the signal light cores 12-1 to 12-n excites $Er^{3+}$, with which the signal light cores 12-1 to 12-n are doped.

The signal light traveling through the signal light cores 12-1 to 12-n, in which $Er^{3+}$ is excited, causes stimulated emission to occur, and accordingly, the signal light propagating through the signal light cores 12-1 to 12-n is amplified.

As illustrated in FIG. 8, the multicore EDF 10a has a structure in which the pumping core 11 is disposed at the center of an optical fiber and the signal light cores 12-1 to 12-n are disposed around the pumping core 11.

With the multicore EDF 10a having such a structure, the pump light radially isotropically propagates from the pumping core 11. Thus, $Er^{3+}$, with which the signal light cores 12-1 to 12-n are doped, may be equally excited.

Figure 9:
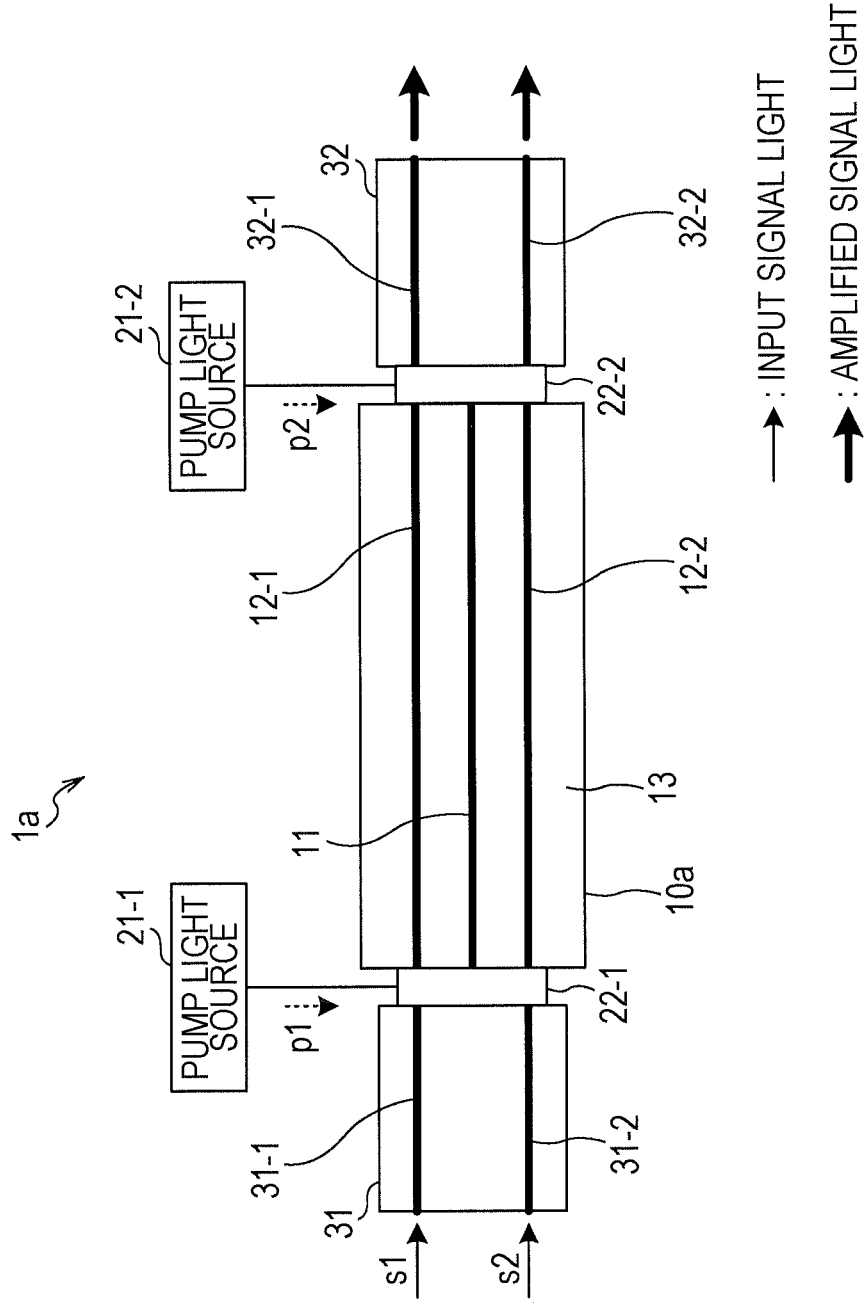
FIG. 9 illustrates an example of the structure of an optical amplifier.

Next, the structure of the optical amplifier 1, in which bi-directional pumping is performed, will be described. FIG. 9 illustrates an example of the structure of an optical amplifier. An optical amplifier 1a includes the multicore EDF 10a, multicore fibers 31 and 32, pump light sources 21-1 and 21-2, and couplers 22-1 and 22-2 (illustration of devices such as optical isolators are omitted).

The optical amplifier 1a performs both forward and backward pumping on the multicore EDF 10a so as to amplify light. In FIG. 9, signal light propagates from the left to right.

The multicore fiber 31 includes two cores 31-1 and 31-2. The multicore fiber 32 includes two cores 32-1 and 32-2.

Signal light s1 and signal light s2 respectively propagate through the cores 31-1 and 31-2 of the multicore fiber 31 and are input to the coupler 22-1. Pump light p1 output from the pump light source 21-1 (referred to as forward pump light hereafter) is input to the coupler 22-1.

The signal light s1, the signal light s2, and the forward pump light p1 are multiplexed by the coupler 22-1. Out of the multiplexed light, the signal light s1 and the signal light s2 are respectively input to the signal light cores 12-1 and 12-2 of the multicore EDF 10a. The forward pump light p1 is input to the pumping core 11 of the multicore EDF 10a.

The forward pump light p1 propagating through the pumping core 11 radially outwardly propagates from the pumping core 11 through the cladding 13 and reaches the signal light cores 12-1 and 12-2. The forward pump light p1 having reached the signal light cores 12-1 and 12-2 excites $Er^{3+}$, with which the signal light cores 12-1 and 12-2 are doped.

The signal light s1 traveling through the signal light core 12-1, in which $Er^{3+}$ is being excited by the forward pump light p1, causes stimulated emission to occur, and accordingly, optical power of the signal light s1 is amplified.

Likewise, the signal light s2 traveling through the signal light core 12-2, in which $Er^{3+}$ is being excited by the forward pump light p1, causes stimulated emission to occur, and accordingly, optical power of the signal light s2 is amplified.

The coupler 22-2 inputs the pump light p2 output from the pump light source 21-2 (referred to as backward pump light hereafter) to the pumping core 11 of the multicore EDF 10a.

The backward pump light p2 propagating through the pumping core 11 radially outwardly propagates from the pumping core 11 through the cladding 13 and reaches the signal light cores 12-1 and 12-2. The backward pump light p2 having reached the signal light cores 12-1 and 12-2 excites $Er^{3+}$, with which the signal light cores 12-1 and 12-2 are doped.

The signal light 51 traveling through the signal light core 12-1, in which $Er^{3+}$ is being excited by the backward pump light p2, causes stimulated emission to occur, and accordingly, the optical power of the signal light s1 is amplified.

Likewise, the signal light s2 traveling through the signal light core 12-2, in which $Er^{3+}$ is being excited by the backward pump light p2, causes stimulated emission to occur, and accordingly, the optical power of the signal light s2 is amplified.

The coupler 22-2 respectively inputs the signal light S1 and the signal light s2, which have been optically amplified by bi-directional pumping in the multicore EDF 10a, to the cores 32-1 and 32-2 of the multicore fiber 32. The optically amplified signal light S1 and s2 are transmitted through the multicore fiber 32 and output to a subsequent processing unit.

Figure 10:
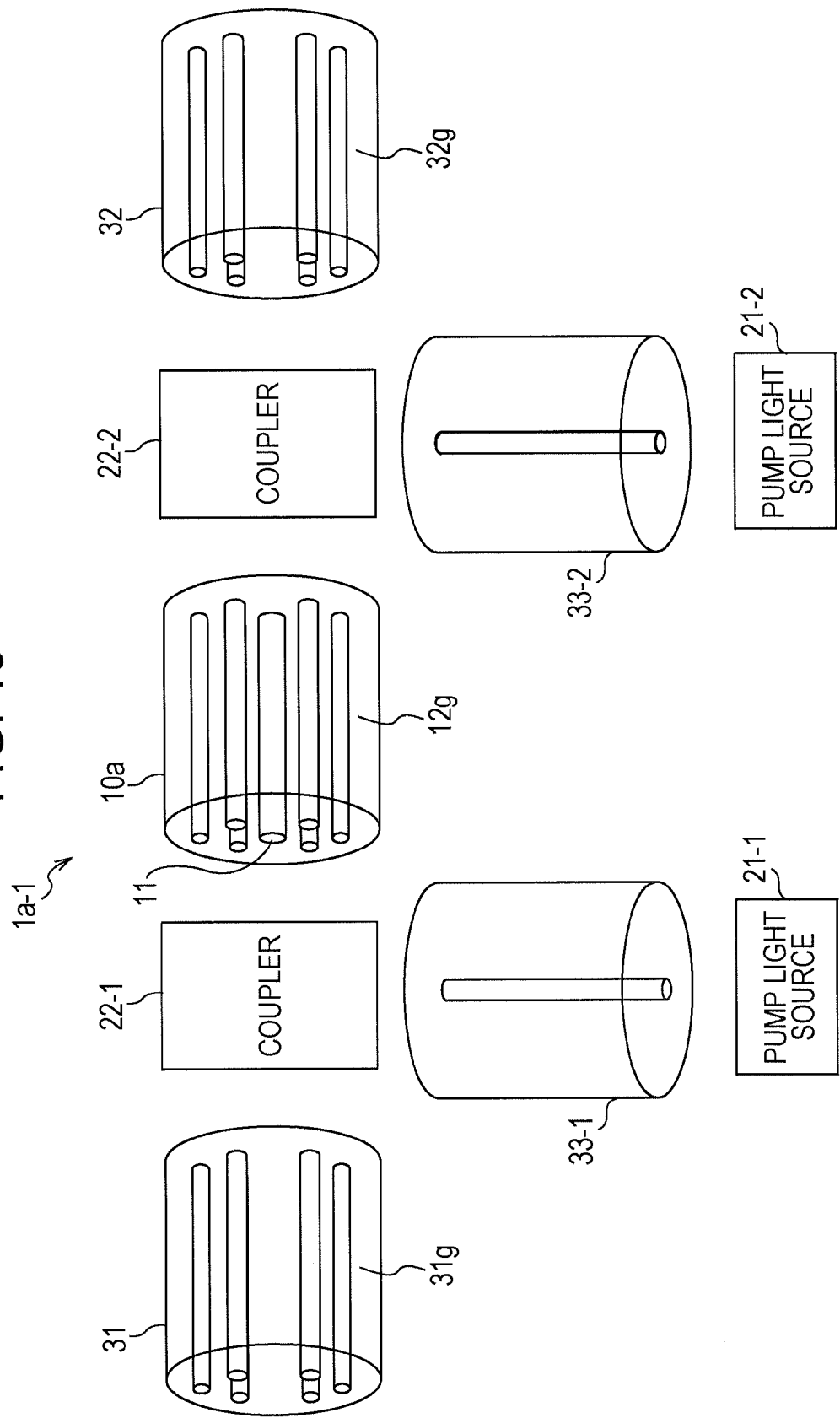
FIG. 10 illustrates an example of the structure of an optical amplifier.

FIG. 10 illustrates an example of the structure of an optical amplifier. An optical amplifier 1a-1 includes the multicore EDF 10a, the multicore fibers 31 and 32, optical fibers 33-1 and 33-2, the pump light sources 21-1 and 21-2, and the couplers 22-1 and 22-2.

The multicore fiber 31 and the optical fiber 33-1 are connected to the coupler 22-1. The multicore fiber 32 and the optical fiber 33-2 are connected to the coupler 22-2.

Although a basic structure of the optical amplifier 1a-1 is similar to that of the optical amplifier 1a illustrated in FIG. 9, the multicore fibers 31 and 32 each have six cores and the multicore EDF 10a has six signal light cores.

Hereafter, the plurality of cores in the multicore fiber 31 are collectively referred to as cores 31g, and the plurality of cores in the multicore fiber 32 are collectively referred to as cores 32g. Likewise, the plurality of signal light cores of the multicore EDF 10a are collectively referred to as signal light cores 12g.

A plurality of rays of signal light input through the cores 31g of the multicore fiber 31 are input to the coupler 22-1. The forward pump light output from the pump light source 21-1 is input to the coupler 22-1 through the optical fiber 33-1.

The coupler 22-1 inputs the received rays of signal light to the signal light cores 12g of the multicore EDF 10a and inputs the forward pump light to the pumping core 11 of the multicore EDF 10a.

The forward pump light radially propagates from the pumping core 11 and reaches the signal light cores 12g. The forward pump light having reached the signal light cores 12g excites $Er^{3+}$, with which the signal light cores 12g are doped. Due to stimulated emission occurring at this time, the plurality of rays of signal light traveling through the signal light cores 12g are collectively amplified.

The backward pump light output from the pump light source 21-2 is input to the coupler 22-2 through the optical fiber 33-2. The coupler 22-2 inputs the backward pump light to the pumping core 11 of the multicore EDF 10a.

The backward pump light radially propagates from the pumping core 11 and reaches the signal light cores 12g. The backward pump light having reached the signal light cores 12g excites $Er^{3+}$, with which the signal light cores 12g are doped. Due to stimulated emission occurring at this time, the plurality of rays of signal light traveling through the signal light cores 12g are collectively amplified.

The coupler 22-2 inputs the signal light, which has been amplified by bi-directional pumping in the multicore EDF 10a, to the cores 32g of the multicore fiber 32. The optically amplified signal light is transmitted through the multicore fiber 32 and output to a subsequent processing unit.

In the above-described structure, the signal light is transmitted through the signal light cores 12g doped with $Er^{3+}$ at a wavelength of, for example, 1550 nm. The wavelength of the pump light is, for example, 1480 nm.

In the above-described optical amplifiers 1a and 1a-1, bi-directional pumping, with which the pump light is input from the front and back, is performed. However, one of forward pumping, with which the pump light is input only from the front, and backward pumping, with which the pump light is input only from the back, may instead be performed in the optical amplifiers 1a and 1a-1.

Figure 11:
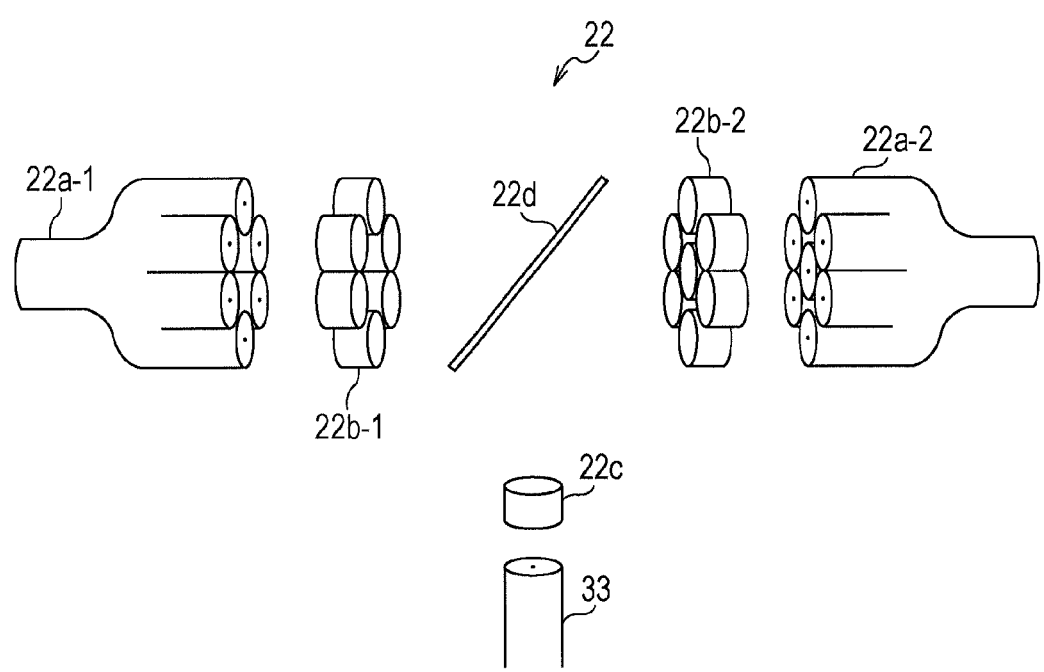
FIG. 11 illustrates an example of the structure of a coupler.

Next, the structures of the coupler 22-1 and 22-2 will be described. FIG. 11 illustrates an example of the structure of the coupler. A coupler 22 includes tapered fibers 22a-1 and 22a-2, micro lens arrays 22b-1 and 22b-2, a micro lens 22c and a dichroic mirror 22d.

The signal light input to the tapered fiber 22a-1 is divided into rays of the signal light for individual cores by the tapered fiber 22a-1. The rays of signal light are input to corresponding micro lenses of the micro lens arrays 22b-1.

The rays of signal light having passed through the micro lens array 22b-1 are directed toward the dichroic mirror 22d and passed the dichroic mirror 22d. The pump light having been transmitted through an optical fiber 33 passes through the micro lens 22c, and after that, is directed to the dichroic mirror 22d and reflected by the dichroic mirror 22d.

The dichroic mirror 22d is a mirror that utilizes optical interference caused by a thin layer or the like so as to allow light of a specific wavelength to pass therethrough and reflect light of wavelengths other than the specific wavelength.

The rays of signal light having passed through the dichroic mirror 22d are input to micro lenses for specified rays of signal light of the micro lens array 22b-2. The pump light having been reflected by the dichroic mirror 22d is input to micro lenses of the micro lens array 22b-2 for specified pump light.

The rays of signal light having passed through the micro lens array 22b-2 are input to optical fibers of the tapered fiber 22a-2, the optical fibers corresponding to respective signal light cores. The pump light having passed through the micro lens array 22b-2 is input to optical fibers of the tapered fiber 22a-2, the optical fibers corresponding to pumping cores. The signal light and the pump light are gathered together in the tapered fiber 22a-2 and output.

Figure 12:
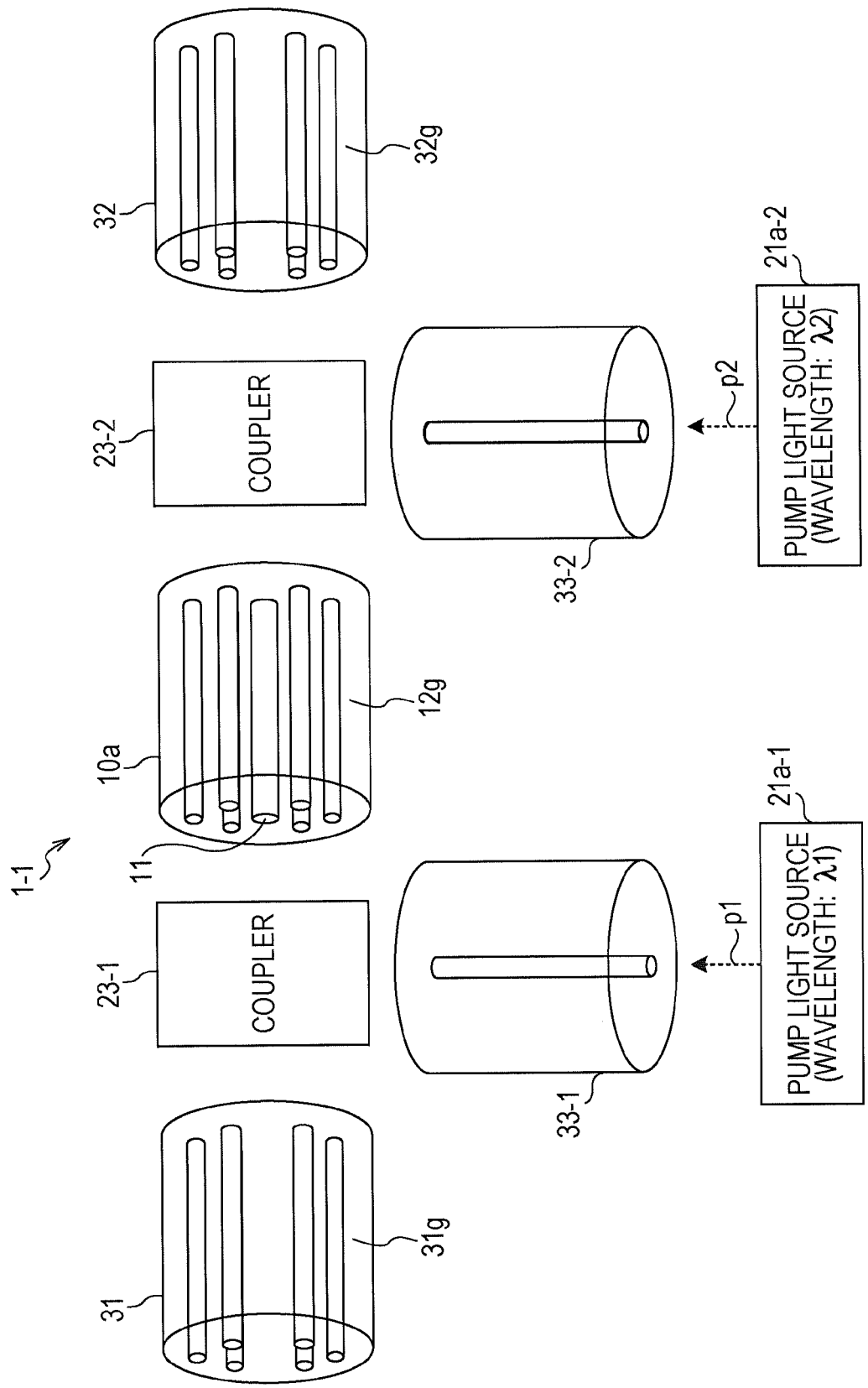
FIG. 12 illustrates an example of the structure of an optical amplifier.
Figure 13:
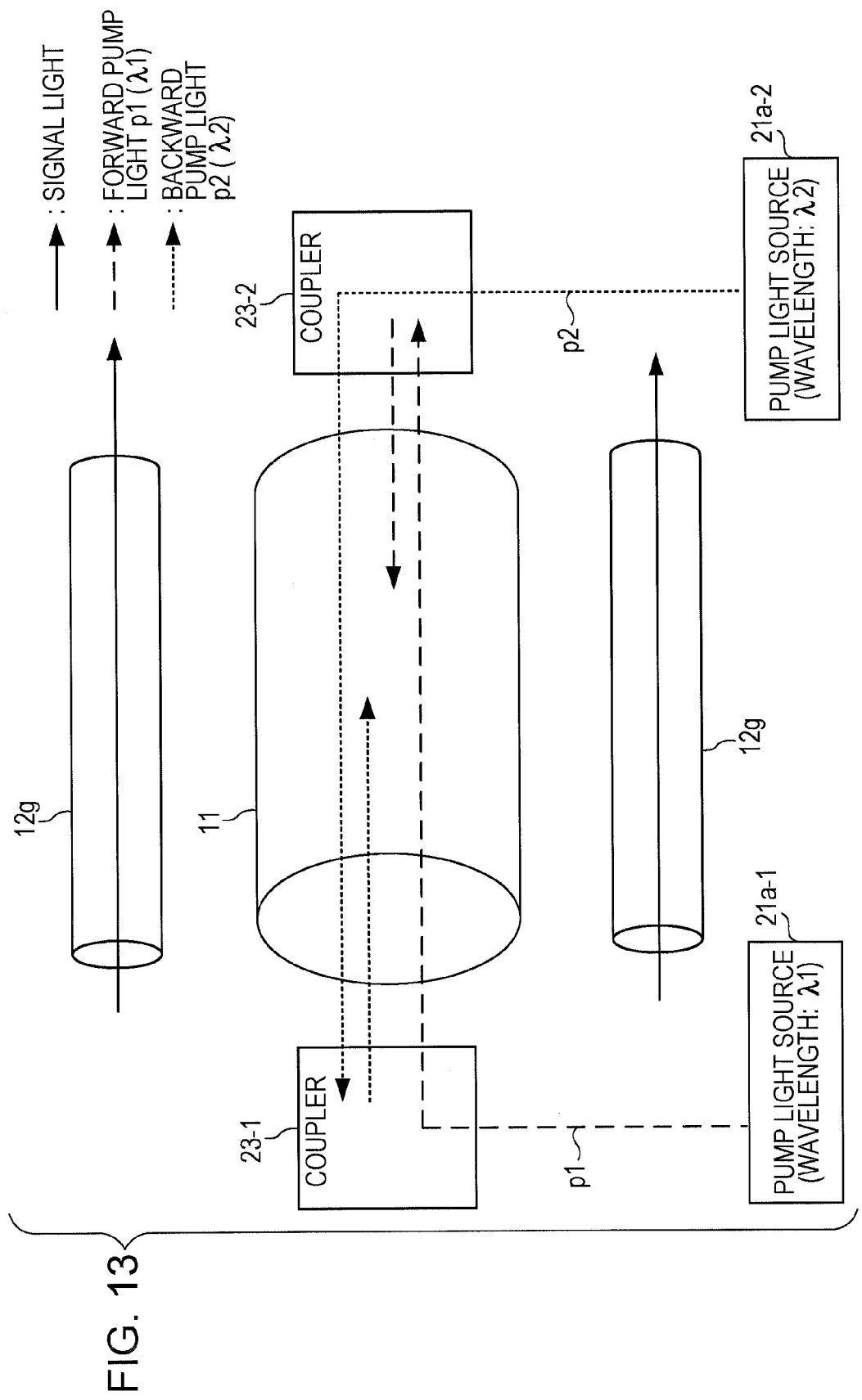
FIG. 13 illustrates propagation of pump light.

Next, a modified example of the optical amplifier 1 will be described. FIG. 12 illustrates an example of the structure of an optical amplifier. FIG. 13 illustrates propagation of pump light. An optical amplifier 1-1 according to a first modified example includes the multicore EDF 10a, the multicore fibers 31 and 32, optical fibers 33-1 and 33-2, pump light sources 21a-1 and 21a-2, and couplers 23-1 and 23-2.

The pump light source 21a-1 emits forward pump light p1 at a wavelength λ1. The pump light source 21a-2 emits backward pump light p2 of at a wavelength λ2. The wavelength λ1 and λ2 are different from each other. Operation of the optical amplifier 1-1 is characteristic in controlling pump light. Operation other than control of the pump light is fundamentally similar to the above-described operation described with reference to FIGS. 9 and 10. Thus, description below is focused on the control of pump light.

Referring to FIG. 13, the coupler 23-1 multiplexes signal light and the forward pump light p1 and inputs the signal light to the signal light cores 12g of the multicore EDF 10a and the forward pump light p1 to the pumping core 11 of the multicore EDF 10a.

Furthermore, the coupler 23-1 reflects back the backward pump light p2, which has propagated through and is output from the pumping core 11 in a direction opposite to a traveling direction of the signal light, and inputs the backward pump light p2 again to the pumping core 11. The backward pump light p2 having propagated through and is output from the pumping core 11 in the direction opposite to the traveling direction of the signal light is leaked pump light, which is the pump light not having been absorbed by $Er^{3+}$ and is output from the pumping core 11.

The coupler 23-2 inputs the backward pump light p2 to the pumping core 11 of the multicore EDF 10a. Furthermore, the coupler 23-2 reflects the forward pump light p1, which has propagated through the pumping core 11 in the same direction as the traveling direction of the signal light, and inputs the forward pump light p1 again to the pumping core 11.

The forward pump light p1 having propagated through and is output from the pumping core 11 in the same direction as the traveling direction of the signal light is leaked pump light, which is the pump light not having been absorbed by $Er^{3+}$ and is output from the pumping core 11.

Figure 14:
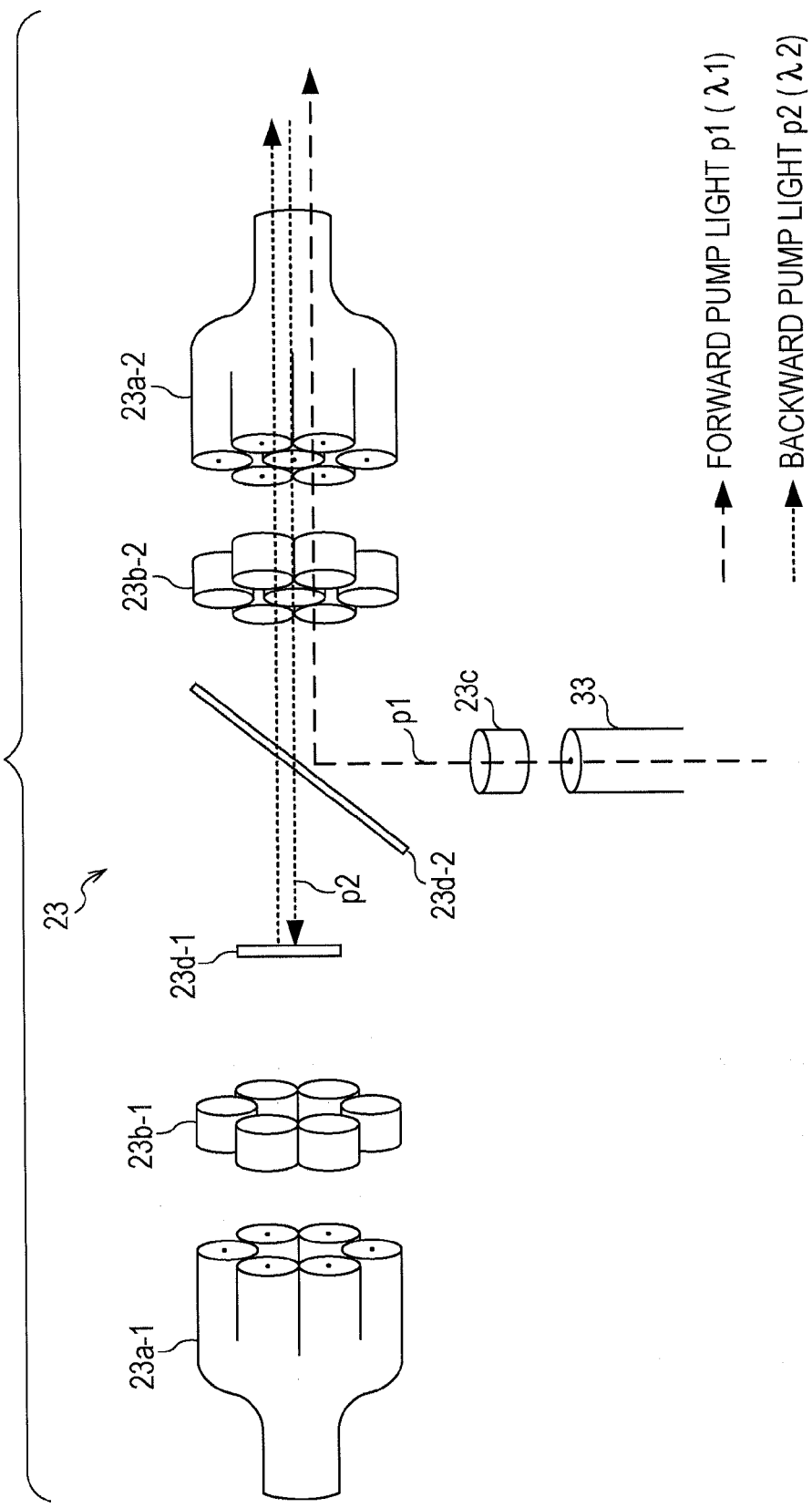
FIG. 14 illustrates an example of the structure of a coupler.

FIG. 14 illustrates an example of the structure of a coupler. A coupler 23 includes tapered fibers 23a-1 and 23a-2, micro lens arrays 23b-1 and 23b-2, a micro lens 23c, and dichroic mirrors 23d-1 and 23d-2.

The dichroic mirror 23d-1 allows the signal light to pass therethrough and reflects the backward pump light p2 of the wavelength of λ2. The dichroic mirror 23d-2 allows the signal light and the backward pump light p2 to pass therethrough and reflects the forward pump light p1 of the wavelength of λ1.

The signal light having been input to the coupler 23 sequentially passes through the tapered fiber 23a-1, the micro lens array 23b-1, the dichroic mirrors 23d-1 and 23d-2, the micro lens array 23b-2, and the tapered fiber 23a-2, and is output to the signal light cores 12g.

The forward pump light p1 having been transmitted through the optical fiber 33 passes through the micro lens 23c, and after that, is reflected by the dichroic mirror 23d-2, passes through the micro lens array 23b-2 and the tapered fiber 23a-2, and is output to the pumping core 11.

The backward pump light p2 passes through the tapered fiber 23a-2, the micro lens array 23b-2, and the dichroic mirror 23d-2, and after that, is reflected by the dichroic mirror 23d-1.

The reflected backward pump light p2 sequentially passes through the dichroic mirror 23d-2, the micro lens array 23b-2, and the tapered fiber 23a-2, and after that, is input to the pumping core 11 again.

As described above, in the optical amplifier 1-1, the leaked pump light is reflected and input to the pumping core 11 again. The leaked pump light is the pump light not having been absorbed by $Er^{3+}$, with which the signal light cores 12g are doped, and output from the pumping core 11.

As described above, the forward pump light p1 and the backward pump light p2, which have not been absorbed by the multicore EDF 10a and have been output from both ends of the multicore EDF 10a, are input to the multicore EDF 10a again. This may improve pumping efficiency.

Next, a second modified example will be described. Optical amplification of the S-band (short band: 1460 to 1530 nm) using an erbium doped optical fiber amplifier (EDFA) is initially described.

Figure 15:
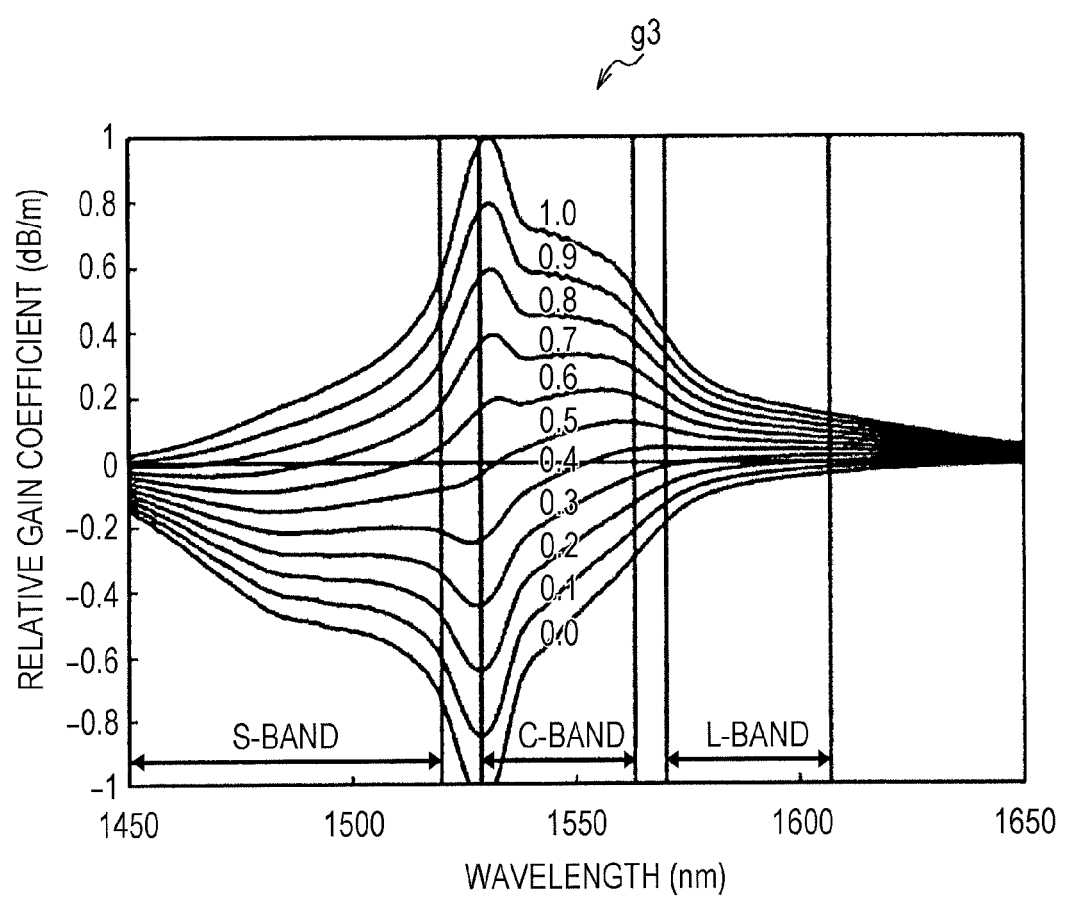
FIG. 15 illustrates a relative gain coefficient for which the population inversion ratio of an erbium doped optical fiber amplifier (EDFA) is a parameter.

FIG. 15 illustrates a relative gain coefficient for which the population inversion ratio of the EDFA is a parameter. The vertical axis indicates the relative gain coefficient and the horizontal axis indicates the wavelength (nm). In a normal state, electrons are more stable in a lower energy level, and accordingly, are distributed to a greater extent in the lower energy state. However, in an excited state, electrons are distributed to a greater extent in the higher energy level. Such a state, in which distribution of electrons is inverted, is referred to as a population inversion. The population inversion ratio represents an excited state of the EDF. As the power of pump light increases, the population inversion ratio increases.

As a spectrum g3 indicates, the EDFA has a gain wavelength characteristic, with which the gain changes in accordance with the wavelength band of signal light to be amplified even when the pump light power is the same.

The wavelength bands to be amplified using the EDFA include the S-band, the C-band (conventional band: 1530 to 1565 nm), L-band (long band: 1565 to 1625 nm), and so forth. It is seen from the spectrum g3 that, out of the wavelength bands to be amplified using EDFA, higher gains are obtained in a range of the wavelength band including the C-band and lower gains are obtained in the S-band.

Thus, in order to amplify signal light in the S-band to the same degree as a gain obtained by amplifying signal light in the C-band with the same level of pump light power, a level of pump light power greater than the level of the pump light power used to amplify the signal light in the C-band is input to the EDF.

For this reason, in order to obtain a sufficient gain in the S-band, the pump light power is increased so as to increase the population inversion ratio. However, when the population inversion ratio of the S-band is increased, gains are increased not only in the S-band, but also in the C-band and the L-band. This leads to a situation in which amplified spontaneous emission (ASE) in the C-band and the L-band markedly occurs, thereby degrading optical amplification efficiency and transmission quality.

Figure 16:
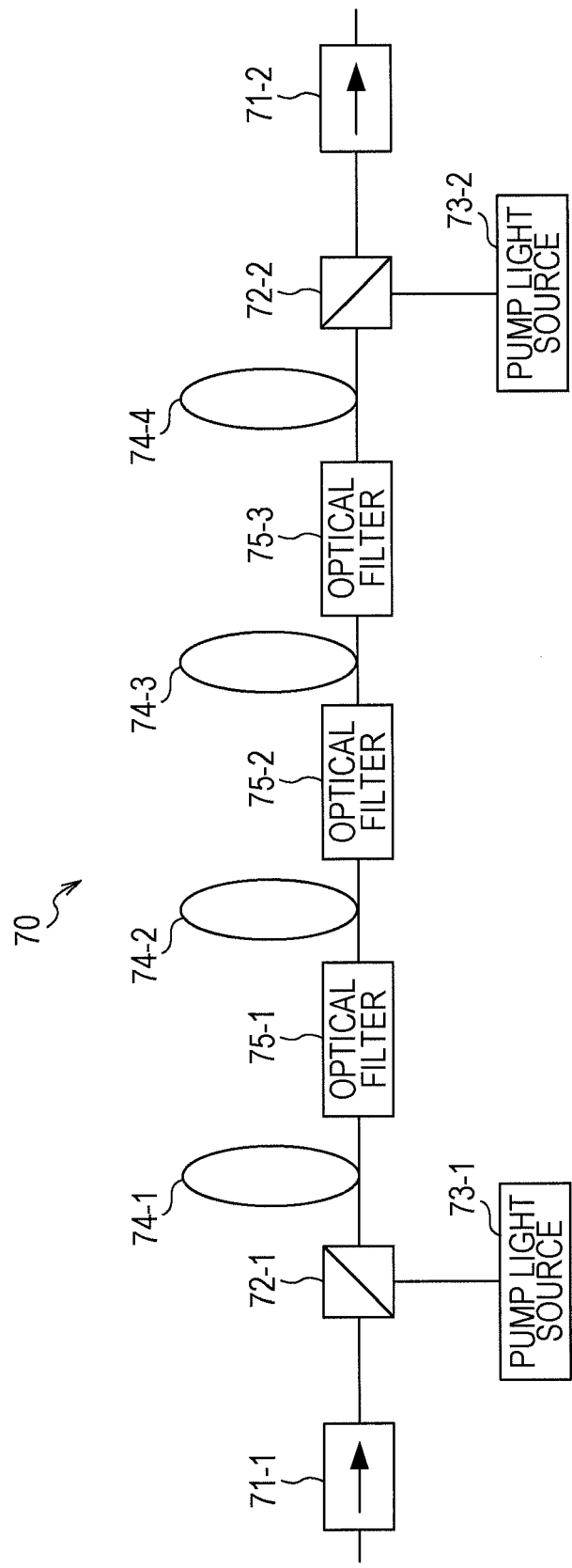
FIG. 16 illustrates an example of the structure of an EDFA.

FIG. 16 illustrates an example of the structure of the EDFA that amplifies the S-band. A related-art EDFA 70 that amplifies signal light in the S-band includes optical isolators 71-1 and 71-2, couplers 72-1 and 72-2, pump light sources 73-1 and 73-2, EDFs 74-1 to 74-4, and optical filters 75-1 to 75-3.

The signal light in the S-band passes through the optical isolator 71-1 and is input to the coupler 72-1. The coupler 72-1 multiplexes the signal light and forward pump light output from the pump light source 73-1. The multiplexed light is input to the EDFs 74-1 to 74-4. The EDFs 74-1 to 74-4 amplify the signal light using forward pumping.

The coupler 72-2 inputs backward pump light output from the pump light source 73-2 to the EDFs 74-1 to 74-4. The EDFs 74-1 to 74-4 amplify the signal light using backward pumping.

The optical filters 75-1 to 75-3 optically filter the signal light having been amplified by the EDFs. The optical filtering includes removal of ASE light in the C-band and the L-and, gain equalization in the S-band, and passing of the pump light.

As described above, the EDFA 70 is provided with the optical filters 75-1 to 75-3 that remove the ASE light in the C- and L-bands and perform gain equalization in the S-band for the multiple stages of the EDFs 74-1 to 74-4, thereby improving optical amplification efficiency.

Figure 17:
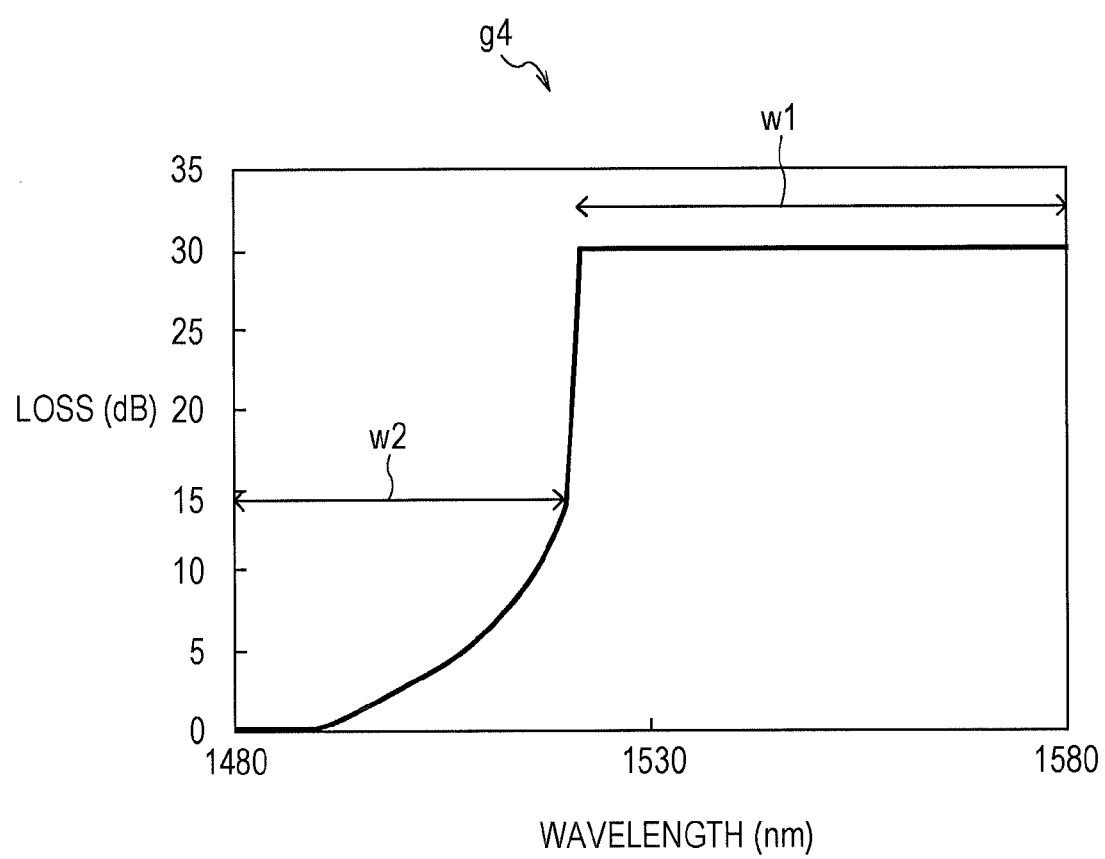
FIG. 17 illustrates a characteristic of an optical filter.
Figure 18:
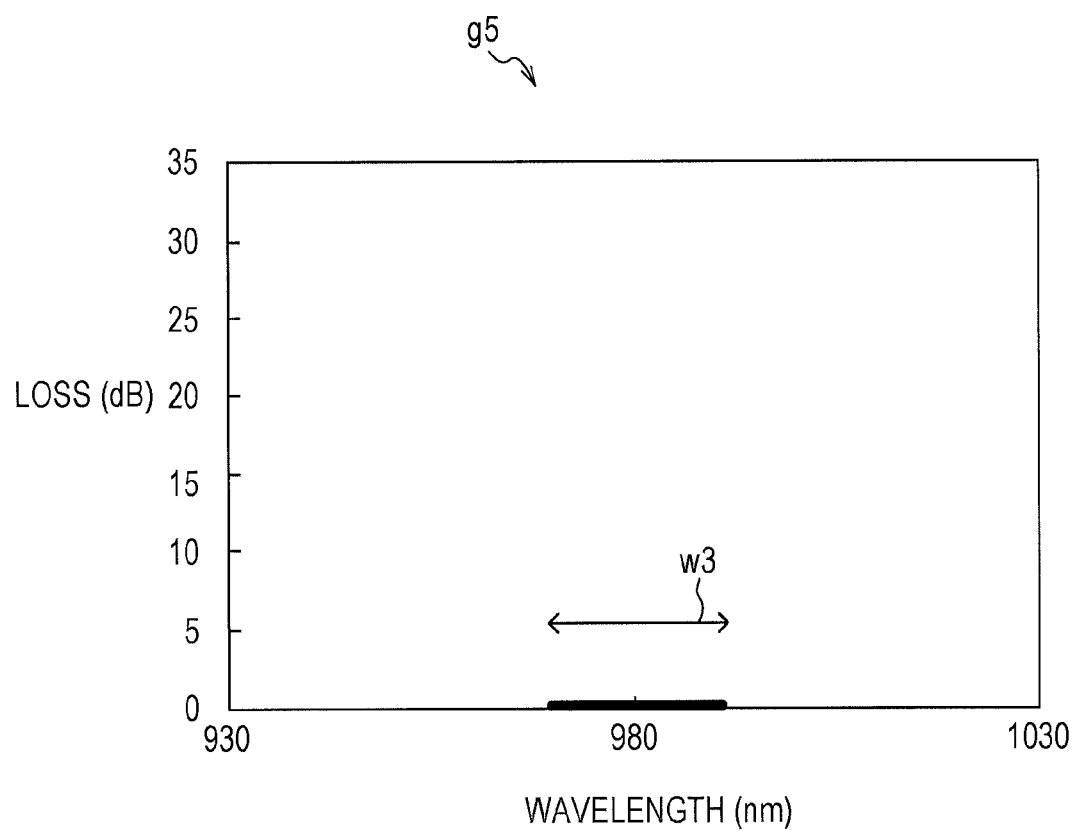
FIG. 18 illustrates the characteristic of the optical filter.

FIGS. 17 and 18 illustrate characteristics of the optical filters 75-1 to 75-3. The vertical axis indicates the loss (dB) and the horizontal axis indicates the wavelength (nm). Referring to FIG. 17, a spectrum g4 illustrates characteristics of the optical filters in removing the ASE light in the C- and L-bands and performing gain equalization in the S-band.

In the wavelength band w1 of the C- and L-bands, the loss is increased to remove the ASE light. In the wavelength band w2 of the S-band, gain equalization in the S-band is performed.

That is, in order to flatten gains in the wavelength band of the S-band, a gain wavelength characteristic that conflicts gain wavelength dependency of the EDF (a loss wavelength characteristic the same as the gain wavelength dependency of the EDF) is optically filtered.

Referring to FIG. 18, a spectrum g5 indicates characteristics of the optical filters in passing the pump light. In the wavelength band w3 for the pump light (in FIG. 18, the wavelength of the pump light is about 980 nm), optical filtering that makes the loss become zero is performed, thereby allowing the pump light to pass.

As described above, the EDFA 70 that optically amplifies the S-band is provided with a plurality of EDFs 74-1 to 74-4. The optical filters 75-1 to 75-3 that remove the ASE light in the C- and L-bands are inserted at positions between adjacent EDFs 74-1 to 74-4, thereby improving optical amplification efficiency.

However, since the EDFA 70 is provided with the plurality of stages of EDFs and optical filters that filter light output from the plurality of stages of EDFs, the number of components and the size of circuitry increase.

Figure 19:
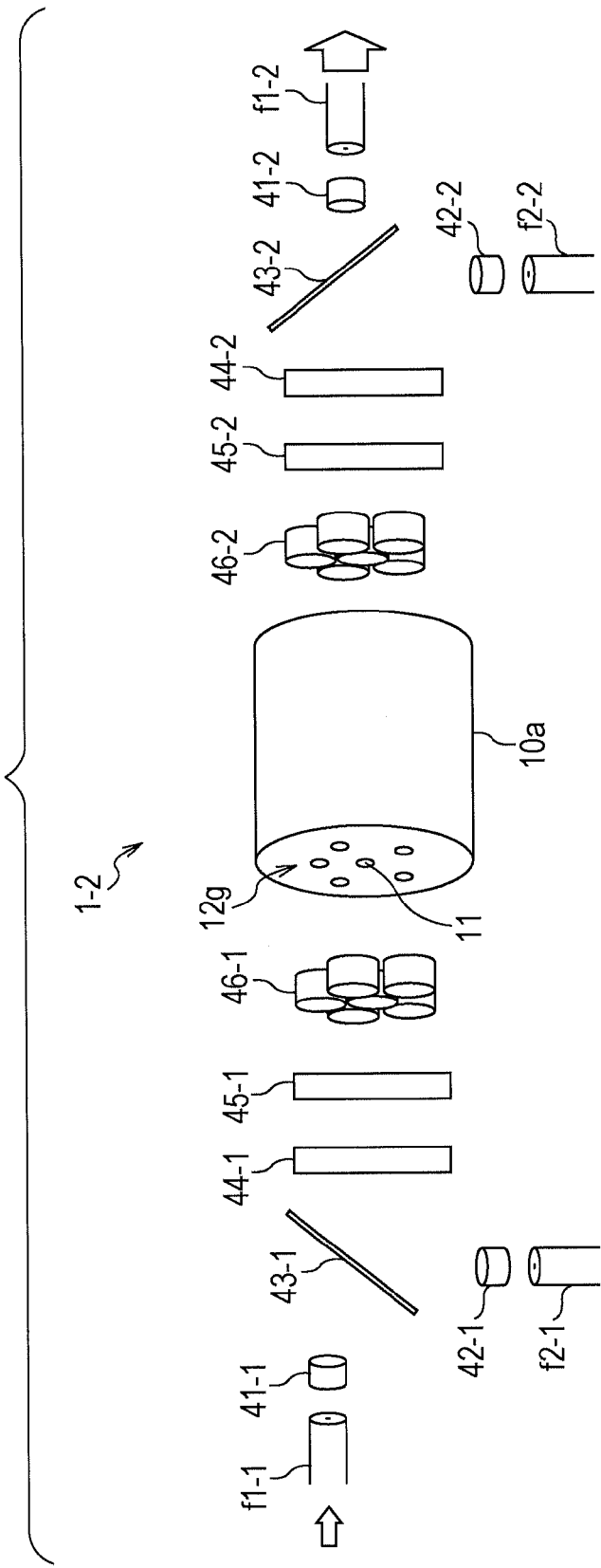
FIG. 19 illustrates an example of the structure of an optical amplifier.

Next, the structure and operation of the second modified example will be described. FIG. 19 illustrates an example of the structure of an optical amplifier. The optical amplifier 1-2 includes micro lenses 41-1, 41-2, 42-1 and 42-2, dichroic mirrors 43-1 and 43-2, mirrors 44-1 and 44-2, optical filters 45-1 and 45-2, micro lens arrays 46-1 and 46-2, and the multicore EDF 10a.

Signal light having propagated through the multicore fiber f1-1 sequentially passes through the micro lens 41-1, the dichroic mirror 43-1, the mirror 44-1, the optical filter 45-1, and the micro lens array 46-1, and is input to the signal light cores 12g of the multicore EDF 10a.

Forward pump light having been input through the optical fiber f2-1 passes through the micro lens 42-1, is reflected by the dichroic mirror 43-1, passes through the mirror 44-1, the optical filter 45-1, and the micro lens array 46-1, and is input to the pumping core 11 of the multicore EDF 10a.

Backward pump light having been input through the optical fiber f2-2 passes through the micro lens 42-2, is reflected by the dichroic mirror 43-2, passes through the mirror 44-2, the optical filter 45-2, and the micro lens array 46-2, and is input to the pumping core 11 of the multicore EDF 10a.

The signal light having been input to the multicore EDF 10a is reflected by the mirrors 44-1 and 44-2 so as to pass through every signal light core 12g of the multicore EDF 10a once. The optical filter 45-1, which is inserted between the multicore EDF 10a and the mirror 44-1, and the optical filter 45-2, which is inserted between the multicore EDF 10a and the mirror 44-2, perform optical filtering such as removal of ASE light.

The mirrors 44-1 and 44-2 use, for example, corner cube mirrors. A corner cube mirror includes three mirrors disposed such that the mirror are perpendicular to one another, thereby reflecting light incoming from any direction at the same angle as the incident angle of the incoming light.

Figure 20:
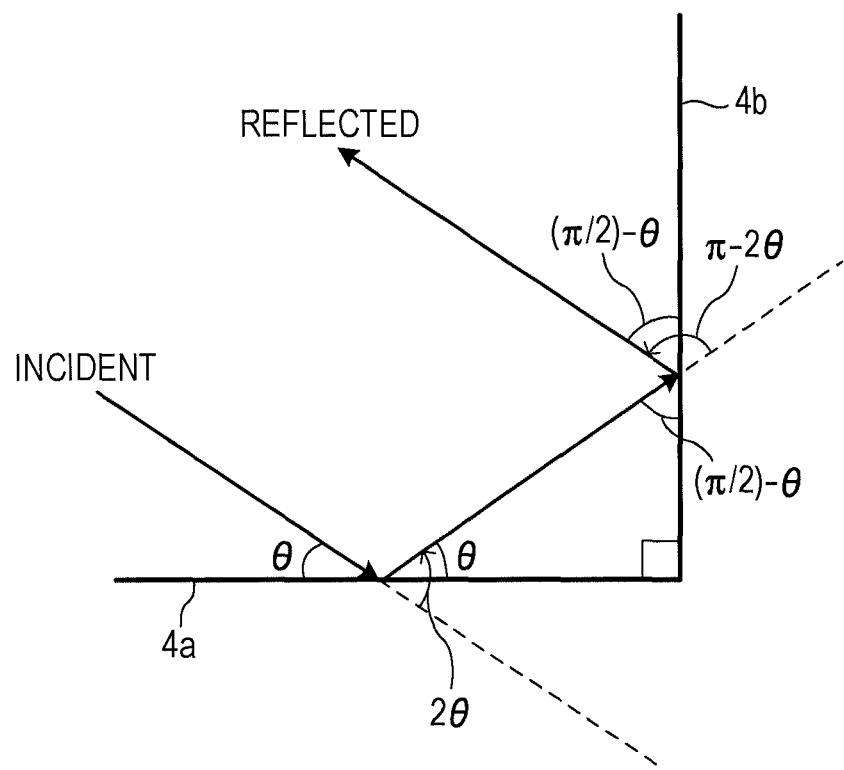
FIG. 20 illustrates operation of a corner cube mirror.

FIG. 20 illustrates operation of a corner cube mirror. For simplicity of description, two mirrors 4a and 4b are described (the same principles are applicable in a case where three mirrors are involved). When light is incident upon the mirror 4a at an incident angle θ, the light is reflected at a reflection angle θ because of the relationship between incident and reflection angles in which the reflection angle is equal to the incident angle. Thus, the light is bent at 2θ by the mirror 4a.

Since the mirrors 4a and 4b are disposed so as to be perpendicular to each other, an angle at which the light reflected by the mirror 4a is incident upon the mirror 4b is (π/2)−θ, and an angle at which the light is reflected by the mirror 4b is also (π/2)−θ. Thus, the light is bent at π−2θ by the mirror 4b.

That is, the light is bent at 2θ by the mirror 4a and at π−2θ by the mirror 4b. The total of these are 2θ+π−2θ=π(180°), which means that the light returns back to the direction where the light came from.

Figure 21:
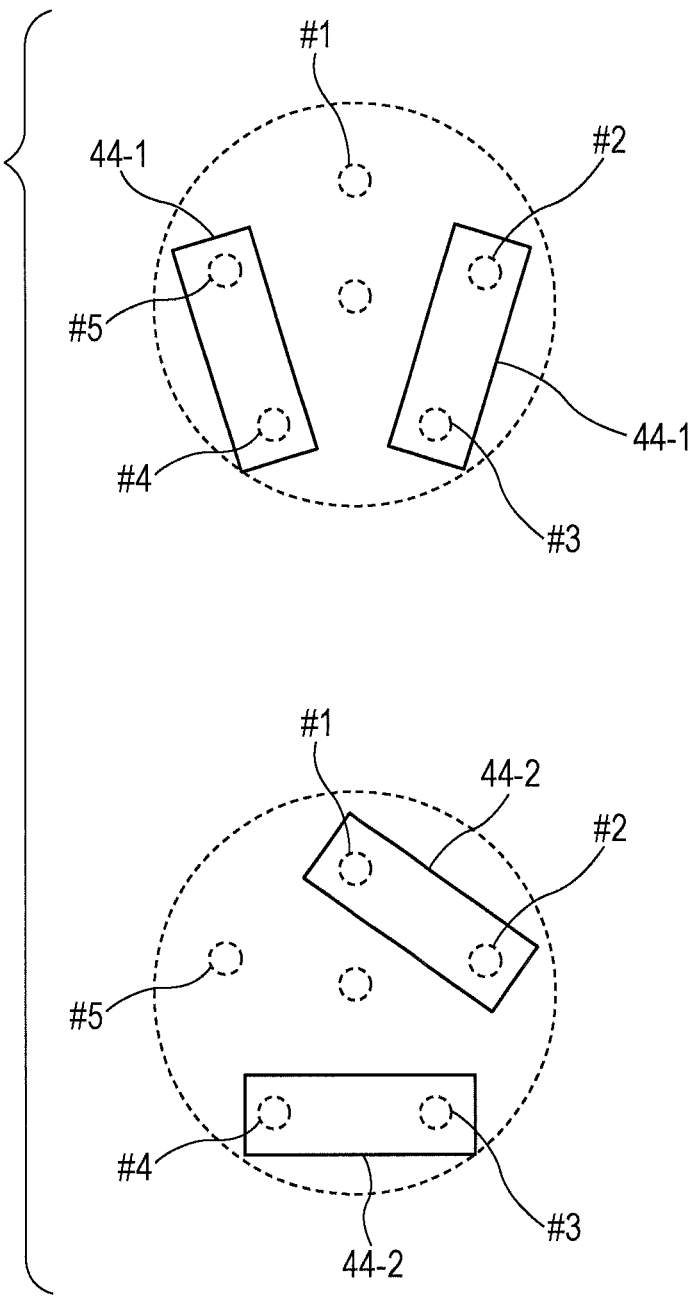
FIG. 21 illustrates arrangement of mirrors.

FIG. 21 illustrates arrangement of the mirrors 44-1 and 44-2. In FIG. 21, numerals #1 to #5 denote signal light cores of the multicore EDF 10a. The mirror 44-1 is arranged so that signal light output from a core #2 is input to a core #3, and the signal light output from a core #4 is input to a core #5.

The mirror 44-2 is arranged so that the signal light output from a core #1 is input to the core #2, and the signal light output from the core #3 is input to the core #4.

Figure 22:
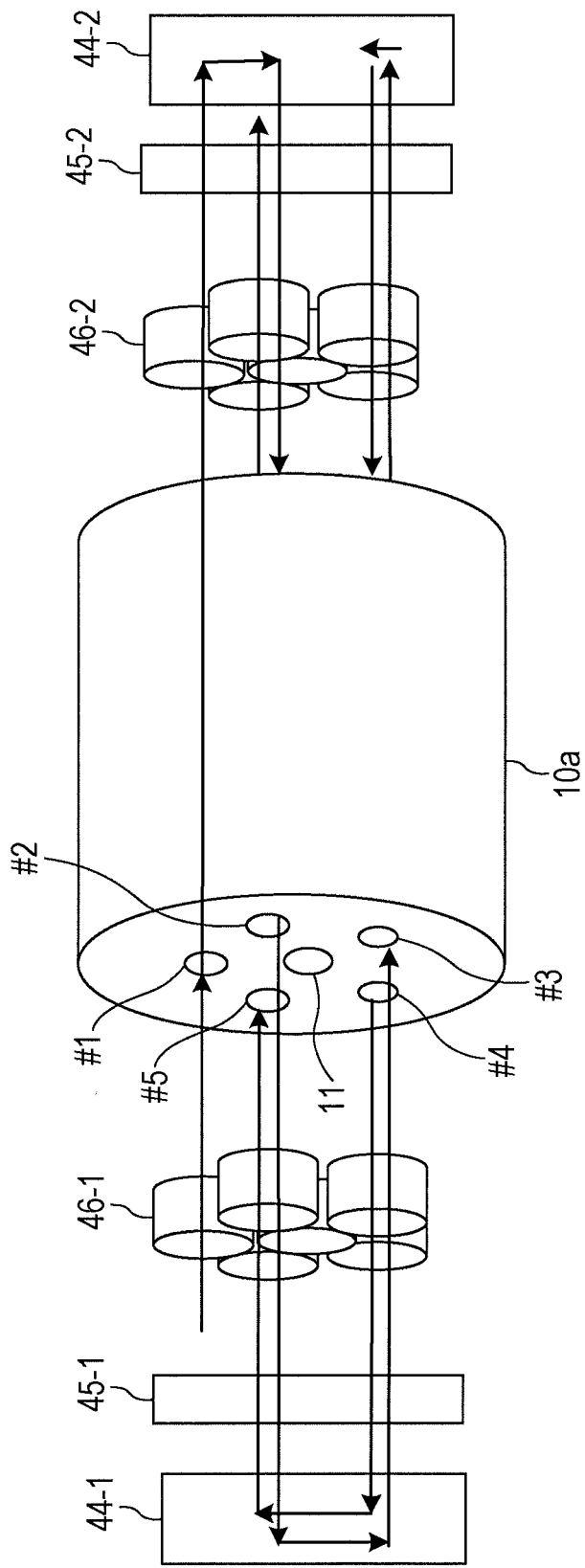
FIG. 22 illustrates propagation of signal light.

FIG. 22 illustrates propagation of signal light. Signal light having passed through the micro lens array 46-1 and been input to the core #1 from the front is output from the multicore EDF 10a, passes through the micro lens array 46-2, is optically filtered by the optical filter 45-2, and is reflected by the mirror 44-2. The reflected signal light passes through the micro lens array 46-2 and is input to the core #2 from behind.

The signal light having been output from the core #2 passes through the micro lens array 46-1, is optically filtered by the optical filter 45-1, and is reflected by the mirror 44-1. The reflected signal light passes through the micro lens array 46-1 and is input to the core #3 from the front.

The signal light having been output from the core #3 passes through the micro lens array 46-2, is optically filtered by the optical filter 45-2, and is reflected by the mirror 44-2. The reflected signal light passes through the micro lens array 46-2 and is input to the core #4 from behind.

The signal light having been output from the core #4 passes through the micro lens array 46-1, is optically filtered by the optical filter 45-1, and is reflected by the mirror 44-1. The reflected signal light passes through the micro lens array 46-1 and is input to the core #5 from the front.

The signal light having been output from the core #5 passes through the micro lens array 46-2, and is optically filtered by the optical filter 45-2. After that, the signal light is not input to the mirror 44-2. The signal light passes through the dichroic mirror 43-2 and micro lens 41-2 illustrated in FIG. 19 and is output.

As described above, the optical amplifier 1-2 is provided with the mirrors 44-1 and 44-2 at ends of the signal light cores 12g. Amplified signal light output from one of the signal light cores 12g is reflected by the mirror 44-1 or 44-2. The reflected signal light is input again to one of the other signal light cores 12g so as to reciprocate the signal light. The signal light output from the signal light cores 12g is optically filtered by the optical filter 45-1 provided between the signal light cores 12g and the mirror 44-1 and the optical filter 45-2 provided between the signal light cores 12g and the mirror 44-2.

As described above, as a result of causing reciprocation of the signal light in the signal light cores (EDFs) of the multicore EDF 10a, the use of a plurality of stages of EDFs such as the EDFs used in the related art is no longer worth considering. Furthermore, with the optical filter provided at each end of the multicore EDF 10a, the signal light is input to the optical filters and optically filtered every time the signal light travels back and forth. This may decrease the number of optical filters.

Thus, the number of components used in the whole optical amplifier may be decreased, and accordingly, the size of the optical amplifier may be reduced. In the above-described structure, the optical filter is provided at each end of the multicore EDF 10a. Alternatively, the optical filter may be provided at one of the ends of the multicore EDF 10a.

Next, a third modified example will be described. A related-art EDFA, with which signal light having a wavelengths in the C-band and the L-band is amplified, is initially described.

Figure 23:
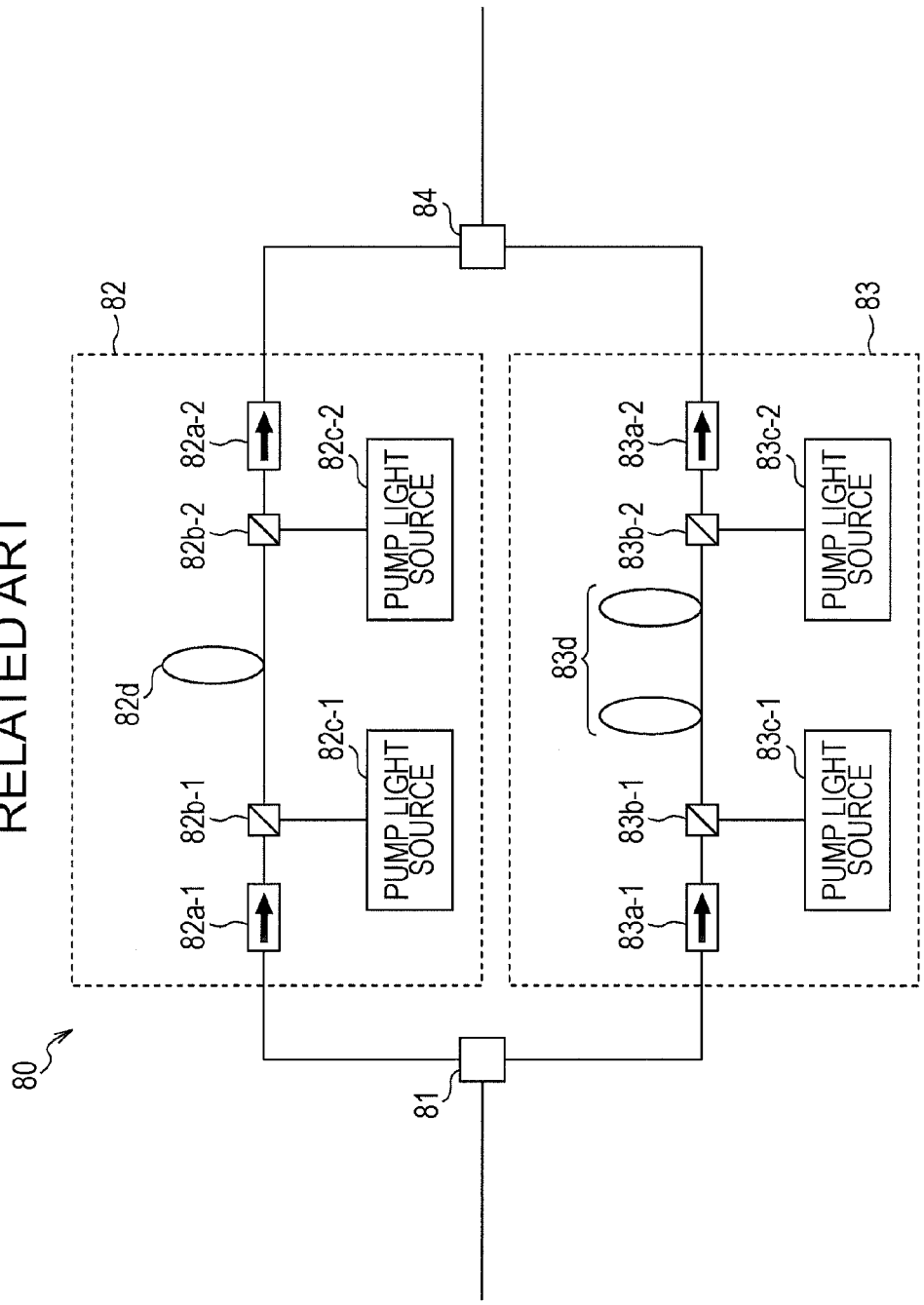
FIG. 23 illustrates an example of the structures of EDFAs.

FIG. 23 illustrates an example of the structure of EDFAs. A related-art EDFA 80 includes a splitting filter 81, a C-band EDFA 82, an L-band EDFA 83, and a multiplexing filter 84.

The C-band EDFA 82 includes an optical isolators 82a-1 and 82a-2, couplers 82b-1 and 82b-2, pump light sources 82c-1 and 82c-2, and an EDF 82d.

The L-band EDFA 83 includes an optical isolators 83a-1 and 83a-2, couplers 83b-1 and 83b-2, pump light sources 83c-1 and 83c-2, and an EDF 83d.

Upon reception of signal light in which wavelengths of the C- and L-bands are multiplexed, the splitting filter 81 splits the signal light into C-band signal light and L-band signal light. The splitting filter 81 transmits the C-band signal light to the C-band EDFA 82 and the L-band signal light to the L-band EDFA 83.

In the C-band EDFA 82, the coupler 82b-1 multiplexes the C-band signal light output from the optical isolator 82a-1 and forward pump light output from the pump light source 82c-1, and outputs the multiplexed light to the EDF 82d.

The coupler 82b-2 inputs backward pump light output from the pump light source 82c-2 to the EDF 82d. The C-band signal light having been amplified by the EDF 82d is output through the coupler 82b-2 and the optical isolator 82a-2.

In the L-band EDFA 83, the coupler 83b-1 multiplexes the L-band signal light output from the optical isolator 83a-1 and forward pump light output from the pump light source 83c-1, and outputs the multiplexed light to the EDF 83d.

The coupler 83b-2 inputs backward pump light output from the pump light source 83c-2 to the EDF 83d. The L-band signal light having been amplified by the EDF 83d is output through the coupler 83b-2 and the optical isolator 83a-2.

The multiplexing filter 84 multiplexes the amplified C-band signal light output from the C-band EDFA 82 and the amplified L-band signal light output from the L-band EDFA 83, and outputs the multiplexed light.

Here, the EDF length of the EDF 82d of the C-band EDFA 82 and the EDF length of the EDF 83d of the L-band EDFA 83 are different from each other. In general, when the EDFs having the same characteristics are used, the EDF for the L-band has a longer EDF length than that of the EDF for the C-band.

For this reason, with the related-art EDFA 80, in order to amplify signal light at wavelengths in the C-band and L-band, the optical amplifiers for respective bands are separately prepared. This increases the size of circuitry and the size of the EDFA 80.

Figure 24:
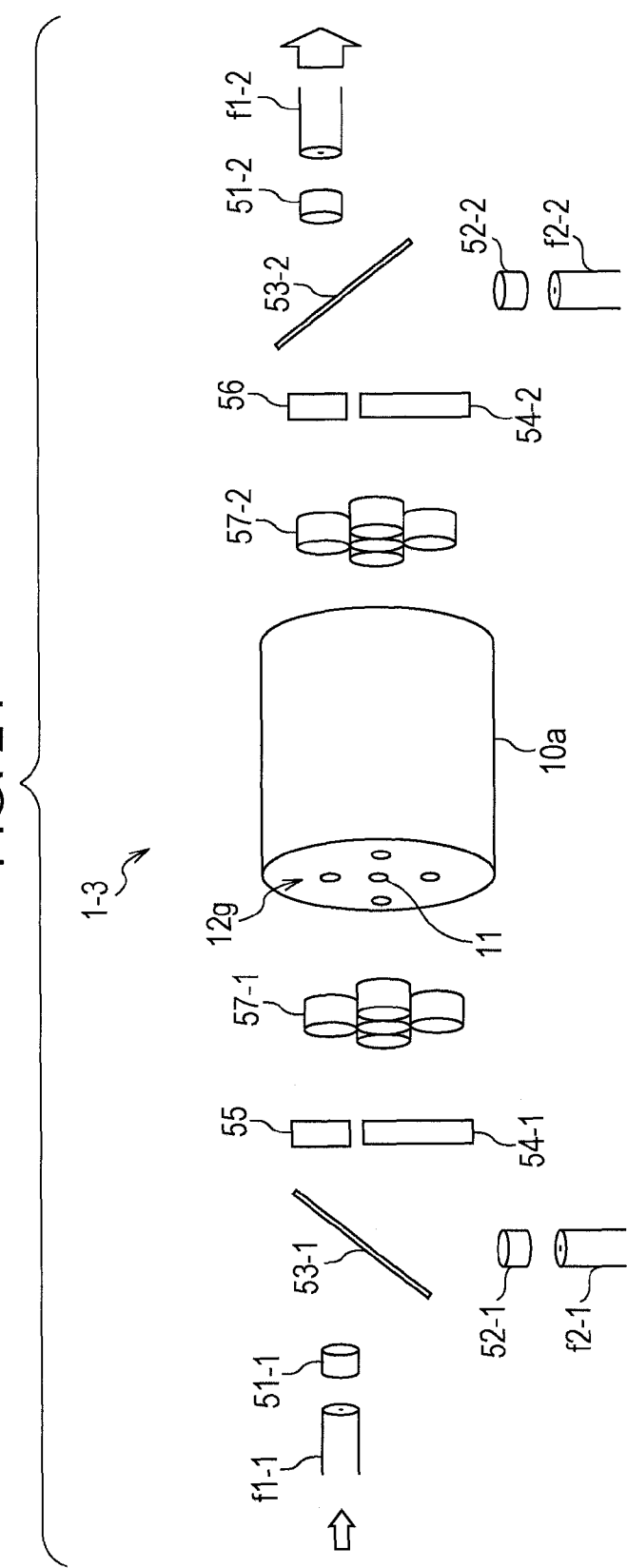
FIG. 24 illustrates an example of the structure of an optical amplifier.

Next, the structure and operation of the third modified example will be described. FIG. 24 illustrates an example of the structure of an optical amplifier. The optical amplifier 1-3 includes micro lenses 51-1, 51-2, 52-1 and 52-2, dichroic mirrors 53-1 and 53-2, mirrors 54-1 and 54-2, splitting filters 55, multiplexing filter 56, micro lens arrays 57-1 and 57-2, and the multicore EDF 10a.

C-band signal light and L-band signal light having propagated through the multicore fiber f1-1 pass through the micro lens 51-1 and dichroic mirror 53-1, and are input to the splitting filter 55.

The splitting filter 55 splits the received signal light into two, that is, the C-band signal light and the L-band signal light. The C-band signal light having been split from the L-band signal light passes through the micro lens array 57-1 and is input to a specified one of the signal light cores 12g of the multicore EDF 10a.

The L-band signal light having been split from the C-band signal light passes through the micro lens array 57-1 and is input to a specified one of the signal light cores 12g of the multicore EDF 10a. The C-band signal light and the L-band signal light are input to the respective signal light cores, which are different from each other.

Forward pump light having been input through the optical fiber f2-1 passes through the micro lens 52-1, is reflected by the dichroic mirror 53-1, passes through the mirror 54-1 and the micro lens array 57-1, and is input to the pumping core 11 of the multicore EDF 10a.

Backward pump light having been input through the optical fiber f2-2 passes through the micro lens 52-2, is reflected by the dichroic mirror 53-2, passes through the mirror 54-2 and the micro lens array 57-2, and is input to the pumping core 11 of the multicore EDF 10a.

The mirrors 54-1 and 54-2, which are inserted at ends of the multicore EDF 10a, cause the C-band signal light and the L-band signal light having been input to the multicore EDF 10a to pass through the signal light cores the numbers of times different from each other. The mirrors 54-1 and 54-2 use, for example, corner cube mirrors.

Figure 25:
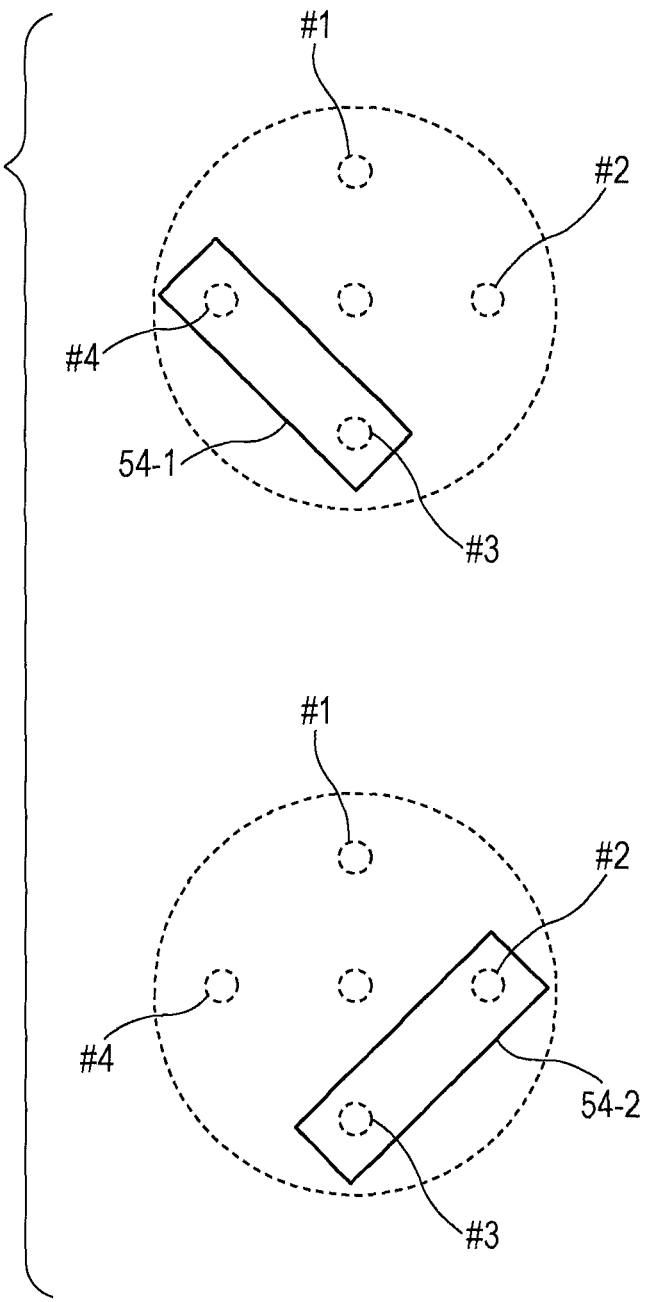
FIG. 25 illustrates arrangement of mirrors.

FIG. 25 illustrates arrangement of the mirrors 54-1 and 54-2. In FIG. 25, numerals #1 to #4 denote signal light cores of the multicore EDF 10a. The mirror 54-1 is arranged such that the signal light output from the core #3 is input to the core #4. The mirror 54-2 is arranged such that the signal light output from the core #2 is input to the core #3.

Figure 26:
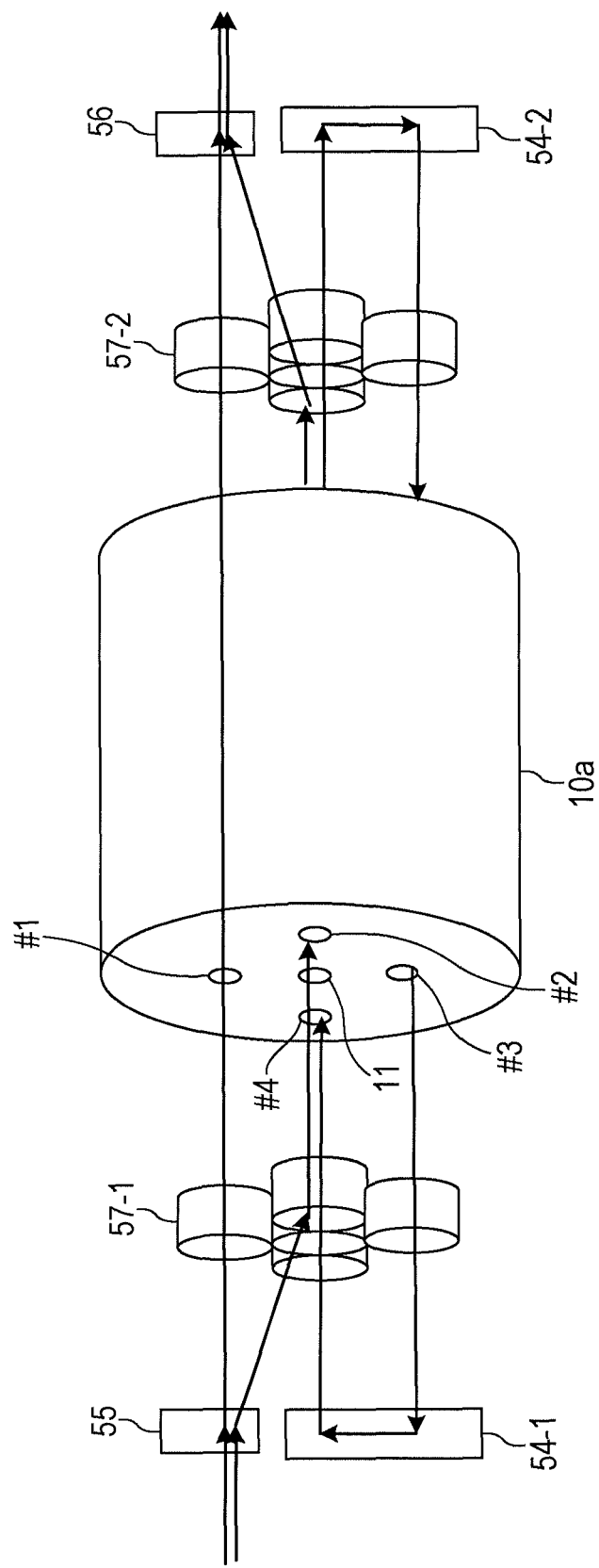
FIG. 26 illustrates propagation of signal light.

FIG. 26 illustrates propagation of the signal light. The C-band signal light having been split from the L-band signal light by the splitting filter 55 passes through the micro lens array 57-1 and is input to the core #1 of the multicore EDF 10a. The C-band signal light passes through the micro lens array 57-2 and is input to the multiplexing filter 56.

The L-band signal light having been split from the C-band signal light by the splitting filter 55 passes through the micro lens array 57-1 and is input to the signal light core #2 of the multicore EDF 10a. The signal light output from the core #2 passes through the micro lens array 57-2 and reflected by the mirror 54-2. The reflected signal light passes through the micro lens array 57-2 and is input to the core #3 from behind.

The L-band signal light output from the core #3 passes through the micro lens array 57-1 and reflected by the mirror 54-1. The reflected signal light passes through the micro lens array 57-1 and is input to the core #4 from the front.

The L-band signal light output from the core #4 passes through the micro lens array 57-2 and is input to the multiplexing filter 56. The multiplexing filter 56 multiplexes the C-band signal light and the L-band signal light and outputs the multiplexed light.

As described above, in the optical amplifier 1-3, the mirrors 54-1 and 54-2 are disposed at the ends of the signal light cores 12g. With respect to specific signal light (for example, L-band signal light) in a specific band (L-band), the amplified L-band signal light output from one of the signal light cores is reflected and the reflected L-band signal light is input again to one of the other signal light cores. Thus, the number of times the L-band signal light passes through the signal light core may be varied.

In the above-described example, the C-band signal light passes through one of the signal light cores, and the L-band signal light passes through three signal light cores. As described above, by causing the L-band signal light to pass through the signal light cores the different number of times, the EDFs having different EDF lengths are effectively realized. Thus, the C-band signal light and the L-band signal light may be collectively amplified with a single multicore EDF 10a. This may reduce the size of circuitry.

As has been described, the optical amplifier 1 amplifies all the signal light propagating through the signal light cores 12-1 to 12-n by collectively exciting the active substance for optical amplification, with which the signal light cores 12-1 to 12-n is doped, using the pump light radially propagating from the pumping core 11.

Accordingly, with pump light output from at least one pump light source, signal light in a plurality of signal light cores may be optically amplified. This may reduce the number of pump light sources, thereby reducing the size of circuitry and the size of a device equipped with the pump light source.

The above-described examples are doped with $Er^{3+}$, which is ions of a rare earth element serving as the active substance for optical amplification. However, ions of another rare earth element such as thulium (Tm) ions, neodymium (Nd) ions, ytterbium (Yb) ions, or praseodymium (Pr) ions may be used.

A reflective element that reflects light may use a dichroic mirror, a corner cube mirror, or a mirror.

Although examples of the embodiments have been described, structures of components described in the embodiments may be replaced with other structures having similar functions. Other arbitrary structures or processes may be added.

The following are notes for the embodiments.

Note 1. An optical amplifier, comprising: a pump light source that outputs pump light; and a multicore fiber that includes: at least one pumping core, the pump light being input to the at least one pumping core by coupler, at least two signal light cores doped with an active substance for optical amplification, at least one signal light being input to at least one of the signal light cores, and a cladding, wherein the pump light propagates the at least one pumping core and excites the active substance in at least one of the signal light cores, so as to amplify the at least one signal light propagating through the at least one of the signal light cores.

Note 2. The optical amplifier according to Note 1, further comprising: a reflective element that reflects the pump light, wherein the reflective element reflects leaked pump light, the leaked pump light being the pump light output from the at least one pumping core, the reflected leaked pump light being input to the at least one pumping core again.

Note 3. The optical amplifier according to Note 1, further comprising: reflective elements that reflect the at least one signal light; and optical filters that optically filter the at least one signal light, wherein the reflective elements are disposed at ends of the at least one of the signal light cores, wherein the amplified signal light output from the at least one of the signal light cores is reflected by the at least one of the reflective elements, the reflected signal light being input again to another signal light core so as to be reciprocated, and wherein the optical filters are each disposed between each of the reflective elements and the at least one of the signal light cores, the optical filters optically filtering the at least one signal light output from the at least one of the signal light cores.

Note 4. The optical amplifier according to Note 1, further comprising: reflective elements that reflect the at least one signal light, wherein the reflective elements are disposed at ends of the at least one of the signal light cores, wherein the at least one signal light is specific signal light of a specific wavelength band, and wherein the amplified specific signal light output from at least one of the signal light cores is reflected by at least one of the reflective elements, the reflected specific signal light being input to another signal light core.

Note 5. The optical amplifier according to Note 1, wherein, in the multicore fiber, the at least one pumping core is disposed at a center of the multicore fiber, and wherein the at least one of the signal light cores being disposed around the at least one pumping core.

Note 6. The optical amplifier according to Note 1, wherein the at least one pumping core has a refractive index at which the pump light radially propagates through the at least one pumping core, the refractive index of the at least one pumping core being an index lower than a refractive index of the at least one of the signal light cores and higher than a refractive index of the cladding.

Note 7. A multicore fiber, comprising: at least one pumping core, pump light being input to the at least one pumping core; and at least two signal light cores doped with an active substance for optical amplification, at least one signal light being input to the at least one of the signal light cores, wherein the pump light radially propagates the at least one pumping core and excites the active substance, with which the signal light core is doped, so as to amplify the at least one signal light propagating through the at least one of the signal light cores.

Note 8. The multicore fiber according to Note 7, wherein the at least one pumping core has a refractive index at which the pump light radially propagates through the at least one pumping core, the refractive index of the at least one pumping core being an index lower than a refractive index of the at least one of the signal light cores and higher than a refractive index of the cladding.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier, comprising:
   a pump light source that outputs pump light; and
   a multicore fiber that includes:
      a pumping core, the pump light being input to the pumping core by coupler,
      a first signal light core doped with an active substance for optical amplification, and
      a second signal light core doped with an active substance for optical amplification,
   wherein the pump light propagates in the pumping core and thereby excites the active substance in the first signal light core and the active substance in the second signal light core, so as to optically amplify a signal light propagating through the first signal light core or a signal light propagating through the second signal light core.

2. The optical amplifier according to claim 1, further comprising:
   a reflective element,
   wherein the reflective element reflects leaked pump light, the leaked pump light being the pump light output from the pumping core, the reflected leaked pump light being input to the pumping core again.

3. The optical amplifier according to claim 1, wherein
   the first signal light core has a first end and a second end,
   the second signal light core has a first end and a second end,
   a signal light enters the first end of the first signal light core, propagates through the first signal light core to thereby be optically amplified, and thereafter exits the second end of the first signal light core, and
   the optical amplifier further comprising:
   a reflective element disposed at the second end of the first signal light core so that the signal light exiting the second end of the first signal light core is reflected by the reflective element and thereby input to the second end of the second signal light core to propagate through the second signal light core from the second end of the second signal light core to the first end of the second signal light core, and
   an optical filter disposed between the second end of the first signal light core and the reflective element, the optical filter optically filtering the signal light exiting from the second end of the first signal light core.

4. The optical amplifier according to claim 1, wherein
   the first signal light core has a first end and a second end,
   the second signal light core has a first end and a second end,
   a signal light enters the first end of the first signal light core, propagates through the first signal light core to thereby be optically amplified, and thereafter exits the second end of the first signal light core, and
   the optical amplifier further comprising:
   a reflective element disposed at the second end of the first signal light core so that the signal light exiting the second end of the first signal light core is reflected by the reflective element and thereby input to the second end of the second signal light core to propagate through the second signal light core from the second end of the second signal light core to the first end of the second signal light core, and
   the signal light exiting the second end of the first signal light core and reflected by the reflective element is specific signal light of a specific wavelength band.

5. The optical amplifier according to claim 1,
   wherein, in the multicore fiber, the pumping core is disposed at a center of the multicore fiber, and
   wherein the first and second signal light cores being disposed around the pumping core.

6. The optical amplifier according to claim 1, wherein
   the multicore fiber includes a cladding between the pumping core and the first signal light core and between the pumping core and the second signal light core,
   the pumping core has a refractive index at which the pump light radially propagates through the pumping core,
   the refractive index of the pumping core being an index lower than a refractive index of the first signal light core and a refractive index of the second signal light core, and higher than a refractive index of the cladding.

7. A multicore fiber, comprising:
   a pumping core, pump light being input to the pumping core;

a first signal light core doped with an active substance for optical amplification; and a second signal light core doped with an active substance for optical amplification, wherein the pump light radially propagates in the pumping core and thereby excites the active substance in the first signal light core and the active substance in the second signal light core, so as to optically amplify at least one of a signal light propagating through the first signal light core and a signal light propagating through the second signal light core.

8. The multicore fiber according to claim 7, wherein the multicore fiber includes a cladding between the pumping core and the first signal light core and between the pumping core and the second signal light core, the pumping core has a refractive index at which the pump light radially propagates through the pumping core, the refractive index of the pumping core being an index lower than a refractive index of the first signal light core and a refractive index of the second signal light core, and being higher than a refractive index of the cladding.

9. A multicore fiber comprising:

a first pumping core;

a first signal light core doped with an active substance for optical amplification;

a second signal light core doped with an active substance for optical amplification; and a cladding between the first pumping core and the first signal light core, and between the first pumping core and the second signal light core, wherein the first pumping core has a refractive index with respect to a refractive index of the first signal light core, a refractive index of the second signal light core, and a refractive index of the cladding, and the first and second signal light cores are disposed with respect to the first pumping core, so that pump light input to the first pumping core radially propagates in the first pumping core and thereby excites the active substance in the first signal light core and the active substance in the second signal light core, to thereby optically amplify at least one of a signal light propagating through the first signal light core and a signal light propagating through the second signal light core.

10. The multicore fiber according to claim 9, further comprising:

a second pumping core;

a third signal light core doped with an active substance for optical amplification; and a fourth signal light core doped with an active substance for optical amplification, wherein the cladding is between the second pumping core and the third signal light core, and between the second pumping core and the fourth signal light core, and the second pumping core has a refractive index with respect to a refractive index of the third signal light core, a refractive index of the fourth signal light core, and a refractive index of the cladding, and the third and fourth signal light cores are disposed with respect to the second pumping core, so that pump light input to the second pumping core radially propagates in the second pumping core and thereby excites the active substance in the third signal light core and the active substance in the fourth signal light core, to thereby optically amplify at least one of a signal light propagating through the third signal light core and a signal light propagating through the fourth signal light core.

11. An optical amplifier comprising the multicore fiber of claim 9.

12. An optical amplifier comprising the multicore fiber of claim 10.

* * * * *

UNITED STATES PATENT AND TRADEMARK OFFICE
CERTIFICATE OF CORRECTION

PATENT NO.        : 8,773,755 B2                                    Page 1 of 1
APPLICATION NO.   : 13/597977
DATED             : July 8, 2014
INVENTOR(S)       : Nishihara et al.

It is certified that error appears in the above-identified patent and that said Letters Patent is hereby corrected as shown below:

On the Title Page Item [56] (OTHER PUBLICATIONS), Line 4, delete "Otpic" and insert
    -- Optic --, therefor.

Signed and Sealed this
Thirtieth Day of September, 2014

Michelle K. Lee
*Deputy Director of the United States Patent and Trademark Office*